US012238605B1

(12) United States Patent
Kinnear et al.

(10) Patent No.: US 12,238,605 B1
(45) Date of Patent: Feb. 25, 2025

(54) SYSTEMS, METHODS, AND DEVICES FOR ANONYMOUS GEOSPATIAL POPULARITY EVALUATION

(71) Applicant: Apple Inc., Cupertino, CA (US)

(72) Inventors: Eric S Kinnear, San Jose, CA (US);
Ozgur Ekici, Ottawa (CA); Adam M Driscoll, Atherton, CA (US); Elliot S Briggs, Carmel, CA (US); Sean M Meiners, San Jose, CA (US); Brandon J Van Ryswyk, Los Altos, CA (US); Siraj T Abidi, Sunnyvale (CA)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 17/669,969

(22) Filed: Feb. 11, 2022

(51) Int. Cl.
*H04W 4/02* (2018.01)
*H04W 4/021* (2018.01)
*H04W 4/029* (2018.01)
*H04W 12/02* (2009.01)
*H04W 12/64* (2021.01)

(52) U.S. Cl.
CPC ........... *H04W 4/021* (2013.01); *H04W 4/029* (2018.02); *H04W 12/02* (2013.01); *H04W 12/64* (2021.01)

(58) Field of Classification Search
CPC ..... H04W 4/021; H04W 4/029; H04W 12/64; H04W 12/02
See application file for complete search history.

(56) References Cited

U.S. PATENT DOCUMENTS

| | | | | |
|---|---|---|---|---|
| 11,343,648 | B2* | 5/2022 | Zimroni | H04W 4/023 |
| 2013/0318115 | A1* | 11/2013 | Smith | H04W 4/90 |
| | | | | 707/758 |
| 2018/0359287 | A1* | 12/2018 | Dorcey | H04L 67/52 |
| 2019/0313209 | A1* | 10/2019 | Edge | H04W 4/02 |
| 2020/0053686 | A1* | 2/2020 | Edge | H04W 52/0229 |
| 2020/0082561 | A1* | 3/2020 | Karonchyk | G06T 7/74 |
| 2020/0100203 | A1* | 3/2020 | Lee | H04W 8/02 |
| 2020/0374653 | A1* | 11/2020 | Dannenbring | G01C 21/3841 |
| 2021/0173887 | A1* | 6/2021 | Petersen | G06F 16/29 |
| 2021/0282006 | A1* | 9/2021 | Edge | H04W 64/00 |
| 2023/0069840 | A1* | 3/2023 | Umezawa | H04L 67/306 |
| 2023/0273049 | A1* | 8/2023 | Dormody | H04W 4/025 |
| | | | | 73/384 |

* cited by examiner

*Primary Examiner* — Khawar Iqbal
(74) *Attorney, Agent, or Firm* — Eschweiler & Potashnik, LLC; Ningjiao Zhang

(57) ABSTRACT

Techniques, described herein, include solutions for anonymous geospatial evaluation via a wireless network. For example, a user equipment (UEs) may monitor a current location of UE for entry into a bounding box associated with a geographic area. Upon entry, the UE may generate and report an anonymous presence indicator to a bounding box server via the wireless network. The anonymous presence indicator may include information describing an instance of a UE being located within the bounding box; however, the anonymous presence indicator may not include information indicating an identifier of UE and/or a user of UE. The UE may report another anonymous presence indicator upon expiration of a re-report timer and/or upon entry into another bounding box.

20 Claims, 14 Drawing Sheets

SYSTEMS, METHODS, AND DEVICES FOR ANONYMOUS GEOSPATIAL POPULARITY EVALUATION

FIELD

This disclosure relates to wireless communication networks including techniques for evaluating wireless communication networks.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology often includes the collection of user data and user device data.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless networks may include user equipment (UEs) capable of communicating with base stations, wireless routers, and other network nodes. Doing so may provide UEs with various services, including call services, messaging services, browsing services, geographic services, and more. Geographic services may include enabling UEs to determine their current geographic location, the location of a destination or point of interest, information about the destination, routes for traveling to the destination, etc. Providing geographic services may include the network collecting information about the UEs and/or users of the UEs.

For example, geographic services may include the network collecting a universally unique identifier (UUID) of the UE along with geographic location information of the UE. Not only does this allow the network to ascertain the location of the UE, but over time, the network may use this information to derive additional information, such as schedule, routine, etc., of UEs and/or users. Some services may go further by combining such information with additional user information to develop an ongoing profile of the user (e.g., user behavior, activity, preferences, place of residence, etc.), which may for example infringe on the privacy of nonconsenting users. This may further become problematic as such information may be transferred or sold to third parties without the knowledge or consent of the user.

Techniques described herein provide solutions for geographic services that preserve the anonymity of UEs and users. More particularly, the techniques described herein enable a network to evaluate the popularity of a geographic location or area without collecting UUIDs or other types of identifying information about the UE or user sending the information. In some instances, the granularity of detail of a user's location can be adjusted to provide varying degrees of information to a network or application, allowing varying levels of protection for the user's anonymity. Details and examples of these techniques are described below with reference to the Figures.

Figure 1:
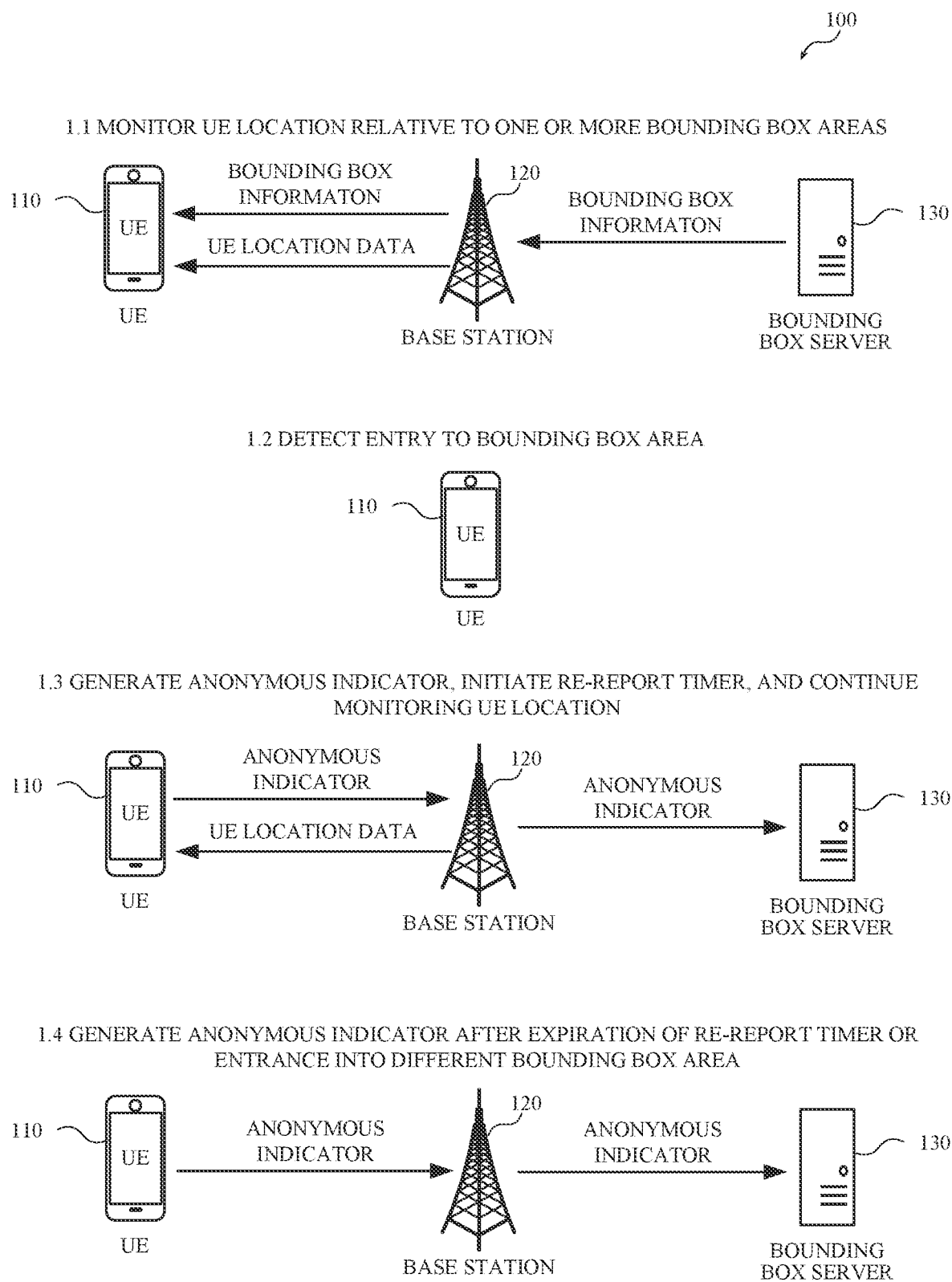
FIG. 1 is a diagram of an example overview according to one or more implementations described herein.

FIG. 1 is a diagram of an example overview 100 according to one or more implementations described herein. As shown, overview 100 may include a UE 110, a base station 120, and a bounding box server 130. UE 110 may receive bounding box information from bounding box server 130. A bounding box (also referred to herein as "bounding box area") may include a geographic location or area to be monitored or evaluated by the network for geospatial popularity. Geospatial popularity may include a measure of how frequently UEs are within a bounding box. Bounding box information may include information describing or defining one or more geographic locations or areas. In some implementations, a bounding box may correspond to a venue, such as a business, museum, park, stadium, or other individually managed space. In some implementations, a bounding box may correspond to a larger space, such as multiple venues, one or more city blocks, a portion of one or more causeways, roads, highways, waterways, etc.

UE 110 may also receive UE location data from base station 120. UE location data, as described herein, may include one or more types of information that enables UE 110 to ascertain its current location (e.g., global positioning system (GPS) data, signal response data from one or more base stations, etc.). UE 110 may monitor a location of UE 110 relative to one or more bounding boxes based on the bounding box information and the UE location data (at 1.1). Additionally, UE 110 may detect when UE 110 enters a bounding box area (at 1.2). In response, UE 110 may generate and send an anonymous indicator (also referred to herein as "anonymous presence indicator") to bounding box server 130 (at 1.3) which bounding box server 130 records as an anonymous instance of a UE having entered the bounding box. As shown, UE 110 may also initiate a re-report timer, during which UE 110 may not re-send another anonymous indicator for the bounding box until the re-report timer has expired. Additionally, UE 110 may continue monitoring a location of UE 110 relative to the bounding box and/or one or more other the bounding boxes.

If UE 110 is still located in the bounding box upon expiration of the re-report timer, UE 110 may generate and send another anonymous indicator corresponding to the bounding box (at 1.4). The re-report timer may be on the order of minutes, hours, days, etc., depending on a granularity with which geospatial popularity is to be measured. Alternatively, if UE 110 moves to a new or different bounding box (e.g., before expiration of the re-report timer), UE 110 may generate and send an anonymous indicator for the new bounding box. Similar to the anonymous indicator of the first bounding box, UE 110 may generate the anonymous indicator for the new bounding box based on the bounding box information received from bounding box server 130. As bounding box server 130 receives anonymous indicators from UEs throughout the network, bounding box server 130 may use the anonymous indicators to measure or determine geospatial popularity of each bounding box. As such, the techniques described herein may enable a network to measure, monitor, and evaluate geospatial popularity throughout the network while preserving the anonymity of UEs and of users of UEs.

As described in additional detail with reference to the following Figures, the techniques described herein may also, or alternatively include one or more additional innovative features, which may include trigger events for reporting anonymous indicators, re-reporting timers for trigger events, tracking schedules, event re-trigger timers, reporting schedules, and so on. These features may be implemented in one or more varieties or combinations, which may further enable evaluation of geospatial popularity according to a desired degree of granularity, according to a type of UE event, and so on.

Figure 2:
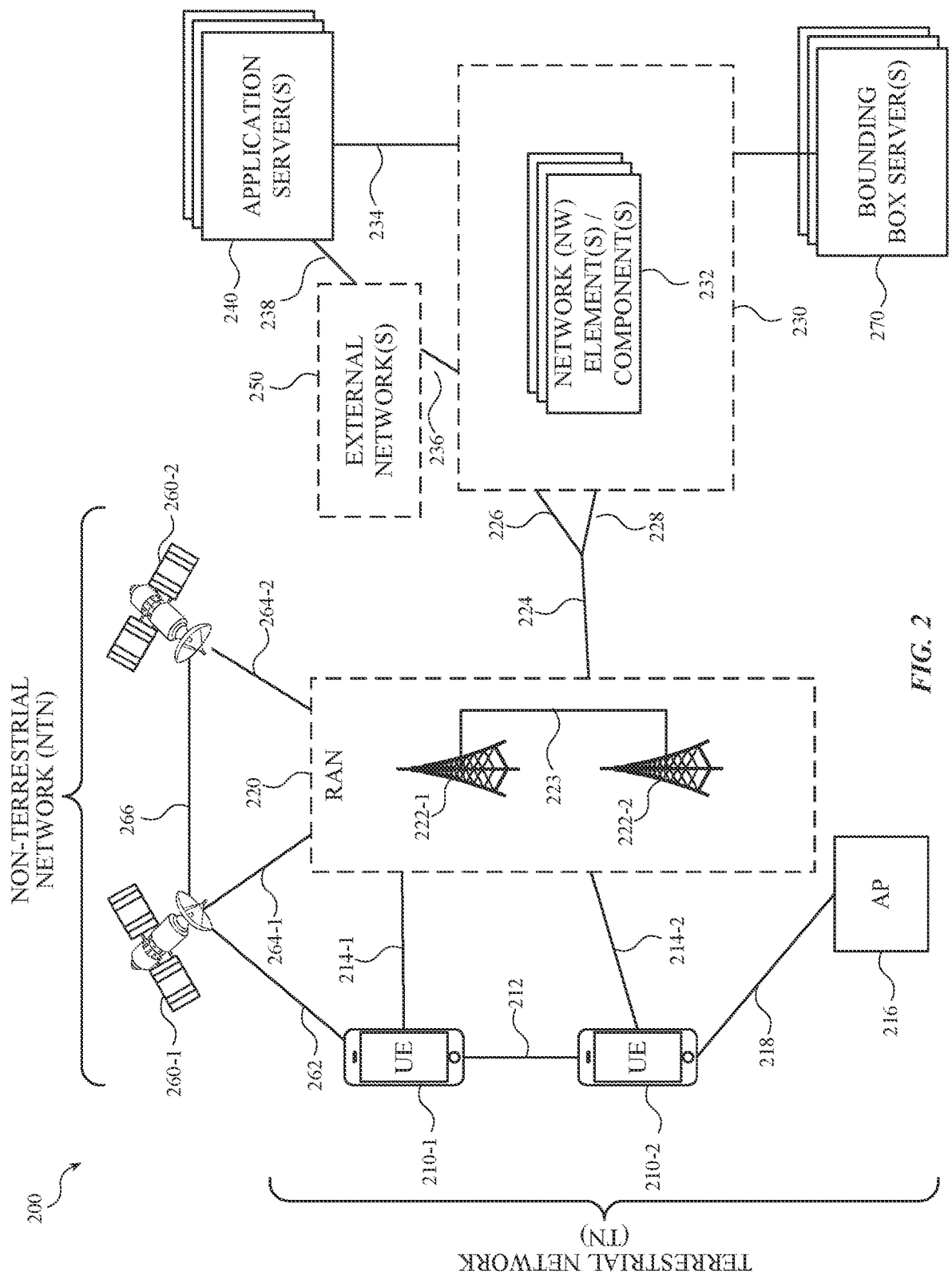
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, external networks 250, and satellites 260-1, 260-2, etc. (referred to collectively as "satellites 260" and individually as "satellite 260"). As shown, network 200 may include a non-terrestrial network (NTN) comprising one or more satellites 260 (e.g., of a global navigation satellite system (GNSS)) in communication with UEs 210 and RAN 220.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, etc. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network nod 222.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection 216 may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and also to implementation where the base station, RAN node 222, etc., is a non-terrestrial network node (e.g., satellite 260).

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may operate using licensed assisted access (LAA), eLAA, and/or feLAA mechanisms. In these implementations, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 210 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe. To operate in the unlicensed spectrum, UEs 210 and the RAN nodes 222 may also operate using stand-alone unlicensed operation where the UE may be configured with a PCell, in addition to any SCells, in unlicensed spectrum.

The PDSCH may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210-2 within a cell) may be performed at any of the RAN nodes 222 based on channel quality information fed back from any of UEs 210. The downlink resource assignment information may be sent on the PDCCH used for (e.g., assigned to) each of UEs 210.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VOIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

As shown, example network 200 may include an NTN that may comprise one or more satellites 260-1 and 260-2 (collectively, "satellites 260"). Satellites 260 may be in communication with UEs 210 via service link or wireless interface 262 and/or RAN 220 via feeder links or wireless interfaces 264 (depicted individually as 264-1 and 264). In some implementations, satellite 260 may operate as a passive or transparent network relay node regarding communications between UE 210 and the terrestrial network (e.g., RAN 220). In some implementations, satellite 260 may operate as an active or regenerative network node such that satellite 260 may operate as a base station to UEs 210 (e.g., as a gNB of RAN 220) regarding communications between UE 210 and RAN 220. In some implementations, satellites 260 may communicate with one another via a direct wireless interface (e.g., 266) or an indirect wireless interface (e.g., via RAN 220 using interfaces 264-1 and 264-2).

Additionally, or alternatively, satellite 260 may include a GEO satellite, LEO satellite, or another type of satellite. Satellite 260 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and implementation, where the base station, RAN node 222, etc., is a non-terrestrial network node (e.g., satellite 260). As described herein, UE 210 and base station 222 may communicate with one another, via interface 214, to enable enhanced power saving techniques.

Bounding box server 270 may include one or more servers, server devices, or network elements (e.g., VNFs) configured to send, receive, process, and/or store information. Bounding box server 270 may communicate with CN via connection or interface 272, which may include IP network interfaces. As described herein, bounding box server 270 may receive, store, and/or process anonymous presence indicators from UEs 210. Bounding box server 270 may also, or alternatively, send configuration information or other information to UEs 210 to enable or facilitate one or more of the techniques described herein.

Figure 3:
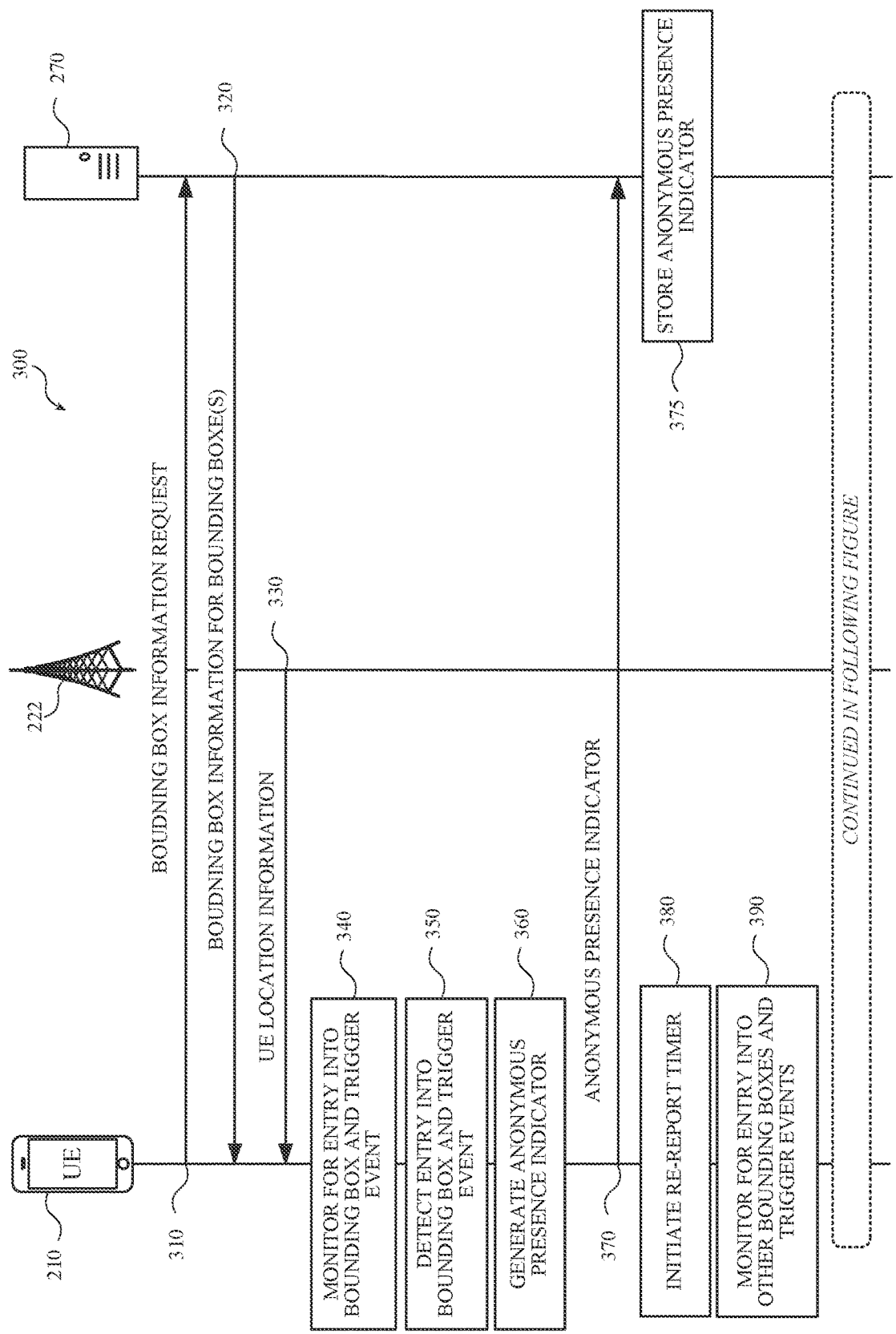
FIGS. 3-4 are diagrams of an example process for anonymous geospatial popularity evaluation according to one or more implementations described herein.
Figure 4:
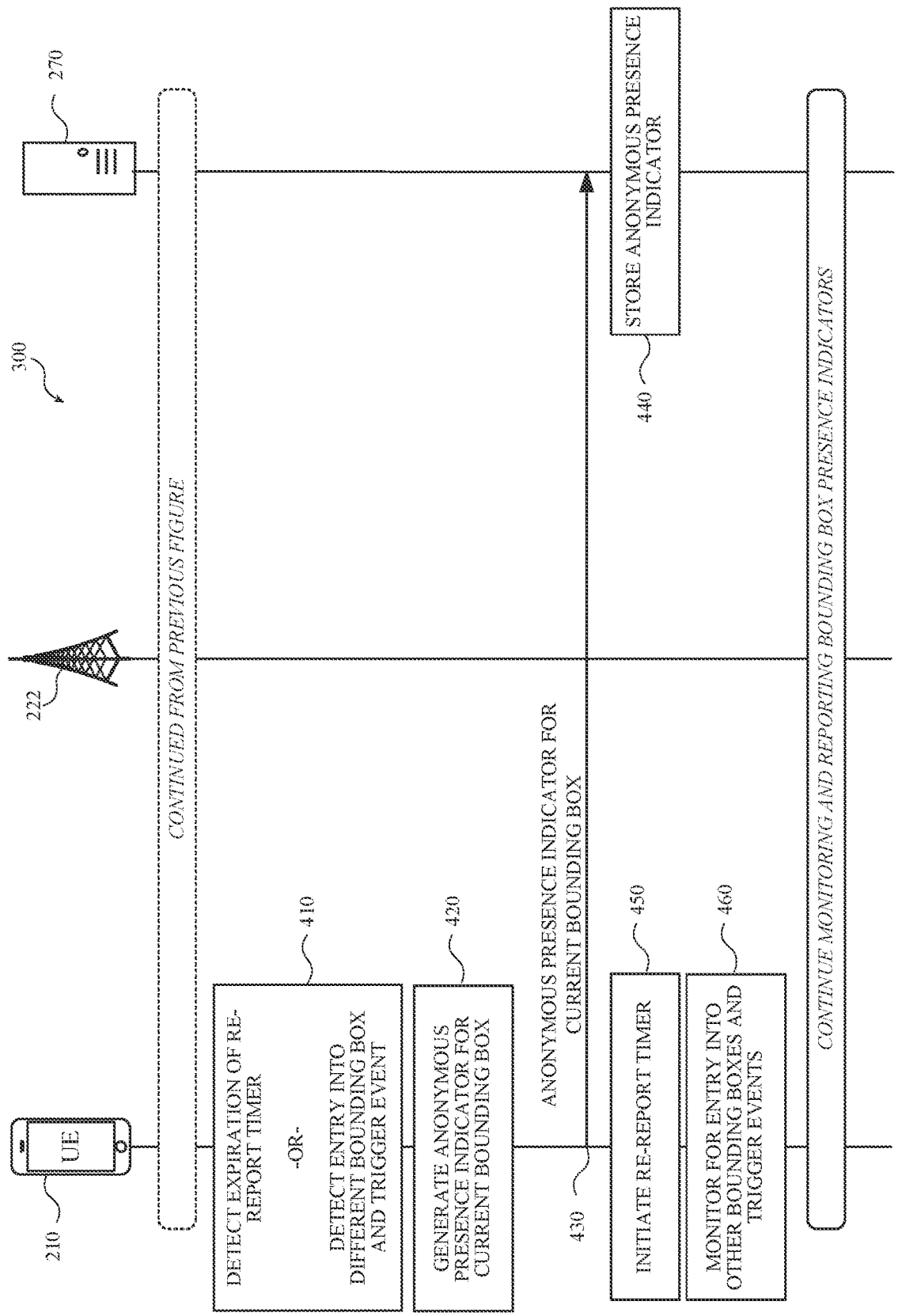

FIGS. 3-4 are diagrams of an example process 300 for anonymous geospatial popularity evaluation according to one or more implementations described herein. Process 300 may be implemented by UE 210, base station 222, and bounding box server 270. In some implementations, some or all of process 300 may be performed by one or more other systems or devices, including one or more of the devices of FIG. 2. Additionally, process 300 may include one or more fewer, additional, differently ordered and/or arranged operations than those shown in FIGS. 3-4. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIGS. 3-4. Additionally, an implementation involving one or more of the operations of process 300 may include one or more operations or functions described herein.

As shown, process 300 may include UE 210 sending, via base station 222, a request for bounding box information to bounding box server 270 (at 310). Bounding box server 270 may respond to the request by providing UE 210 with bounding box information for one or more bounding boxes (at 320). As described herein, bounding box information may include one or more types of information, such as a description of the geographic area of a bounding box, a trigger event for the bounding box, a re-report timer for the bounding box, and more. Examples of bounding box information are discussed below with reference to FIGS. 6-9.

In some implementations, bounding box information may be provided to UE 210 in one or more additional or alternative ways, such as being installed on UE 210 at the time of production. Additionally, or alternatively, UE 210 may be configured to periodically request and/or receive bounding box information according to a pre-defined schedule (e.g., every week, month, etc.), in combination with an update to an operating system or application of UE 210, in response to instructions received from the network (e.g., base station 222), in response to a push operation initiated by bounding box server 270, in response to moving to a location outside a geographic area associated with one or more bounding boxes (e.g., another city, county, state, etc.), or another type of trigger or condition.

As shown, UE 210 may receive UE location information from base station 222 (at 330). In some implementations, UE 210 may also, or alternatively, receive UE location information from one or more other sources, such as AP 216, satellite 260, another UE 210, etc.). As described herein, UE location information may include any type of information that may describe the current location of UE 210 or enable UE 210 to determine the current location of UE 210, such as GPS information, signal timing information, location information of one or more nearby device (e.g., AP 216 or another UE 210), etc. UE 210 may use the bounding box information to monitor a current location of UE 210 for entry into a bounding box and trigger event associated with the bounding box (at 340). A trigger event may include one or more of a variety of pre-selected events or conditions associated with the bounding box, such as UE 210 making a call, sending a text message, executing a financial transaction, performing a data search, etc. In some implementations, a trigger event may include entry into a bounding box itself.

In some implementations, UE 210 may be configured to begin monitoring for the trigger event after entry into the bounding box. In other implementations, UE 210 may be configured to begin monitoring for the trigger event at the same time UE 210 begins monitoring for entry into the bounding box. In some implementations, when UE 210 may begin monitoring for the trigger event may depend on the type of trigger event. For example, when the trigger event involves an extended duration, such as a call, an application running, a network service being executed, etc., UE 210 may begin monitoring for the trigger event before entering the bounding box. In such a scenario, UE 210 may proceed with process 300 immediately upon detecting entry into the bounding box simultaneously. Alternatively, when the trigger event involves a shorter or instantaneous duration, such as sending or receiving a text message, a particular message from the network, initiating a financial transaction, etc., UE 210 may begin monitoring for the trigger event after detecting entry into the bounding box. In such implementations, UE 210 may conserve power by postponing trigger even detection processes until after they become relevant. Accordingly, UE 210 may detect entry into the bounding box and trigger event (block 350).

In response, UE 210 may generate an anonymous presence indicator (at 360) and communicate the anonymous presence indicator to bounding box server 270 via base statin 222 (at 370). In some implementations, the anonymous presence indicator may be a Boolean value associated with a parameter in the reporting message sent to bounding box server 270. In other implementations, UE 210 may produce the anonymous presence indicator based on one or more types of bounding box information received from bounding box server 270. Additionally, or alternatively, the anonymous presence indicator may include one or more other types of data, such as a date and/or time that UE 210 detects entry into the bounding box, transmission of the anonymous presence indicator, a time interval based on UE 210 sending the anonymous presence indicator and re-report timer, etc. The anonymous presence indicator may include information sufficient for bounding box server 270 to register or record an instance of a UE being in the bounding box, which may later be combined with other anonymous presence indicator to evaluate a geospatial popularity of the bounding box area. However, the anonymous presence indicator and the message carrying the anonymous presence indicator may not include any information that could enable identification of UE 210 and/or a user of UE 210 (e.g., without providing a UUID of UE 210, user data stored by UE 210, applications running on UE 210, base station 222, etc.). As such, the techniques described herein may enable the geospatial popularity of selected geographic areas (e.g., bounding boxes) to be monitored, measured, and evaluated while preserving the complete privacy and anonymity of all reporting users and UEs 210.

In response to UE 210 sending the anonymous presence indicator, bounding box server 270 may store the anonymous presence indicator (at 375), and UE 210 may initiate a re-report timer (at 380). A re-report timer, as descried herein, may include a duration of time during which UE 210 is not to send another anonymous presence indicator to bounding box server 270 about the same bounding box or, optionally, the same trigger event. The duration of the re-report timer may be any combination of seconds, minutes, hours, days, weeks, months, etc., and may vary based on one or more factors, such a processing capacity of UE 210, conservation of a battery life of UE 210, an availability of wireless resources (e.g., wireless channels, bandwidth, network congestion, etc.), a previously measured geospatial popularity of the bounding box, an expected frequency with which the trigger event is to occur, availability of network device resources (e.g., an expected processing capacity of base station 222), a target granularity for evaluating the geospatial popularity of the bounding box, etc.

UE 210 may also continue to monitor for entry into other bounding boxes and trigger events (at 390). UE 210 may do so while the re-report timer is running since the re-report timer may be configured to delay additional reporting for the same bounding box but not for entry into other bounding boxes. In some implementations, the re-report timer may continue even after UE 210 leaves the bounding box. In other implementations, UE 210 may expire the re-report timer upon detecting that UE 210 has left the bounding box. In yet other implementations, UE 210 may modify (e.g., speed-up or reduce) the re-report timer or initiate a replacement re-report timer (e.g., a shorter timer) in response to leaving the bounding box. Similar to the monitoring described above, here, UE 210 may begin monitoring for the other bounding boxes and trigger events at the same time or may wait to monitor for trigger events until after UE 210 has detected entry into another bounding box. Additionally, or alternatively, trigger events may be the same for all bounding boxes or may be different for different bounding boxes.

Referring now to FIG. 4, UE may detect expiration of the re-report timer or detect entry into a different bounding box and associated trigger event (at 410). In response, UE 210 may generate an anonymous presence indicator for the current bounding box (at 420). When the current bounding box is the same bounding box, such that UE 210 is reporting the anonymous presence indicator in response to expiration of the re-report timer, the anonymous presence indicator may be the same or similar as the anonymous presence indicator. For example, newly the anonymous presence indicator may include information sufficient for bounding box server 270 to register an instance of a UE being in the bounding box without providing any information that could enable identification of UE 210 and/or a user of UE 210. In some implementations, the newly reported anonymous presence indicator may differ from a previously reported anonymous presence indicator by including different timing or other anonymous information. When the current bounding box is a different bounding box, such that UE 210 has entered a different bounding box before expiration of the re-report timer, the anonymous presence indicator may be similar in the sense that no identifying information is included. However, the anonymous presence indicator may properly identify the new bounding box from the previous anonymous presence indicator.

Similar to operations described above in reference to FIG. 3, bounding box server 270 may store the anonymous presence indicator for the current bounding box (at 440). Additionally, UE 210 may initiate a re-report timer for the current bounding box (at 450) and continue to monitor for entry into other bounding boxes and trigger events (at 460). Accordingly, the techniques described herein may enable geospatial popularity evaluation of multiple bounding boxes without breaching the privacy, or otherwise inappropriately collecting information, of users or UEs 210.

Figure 5:
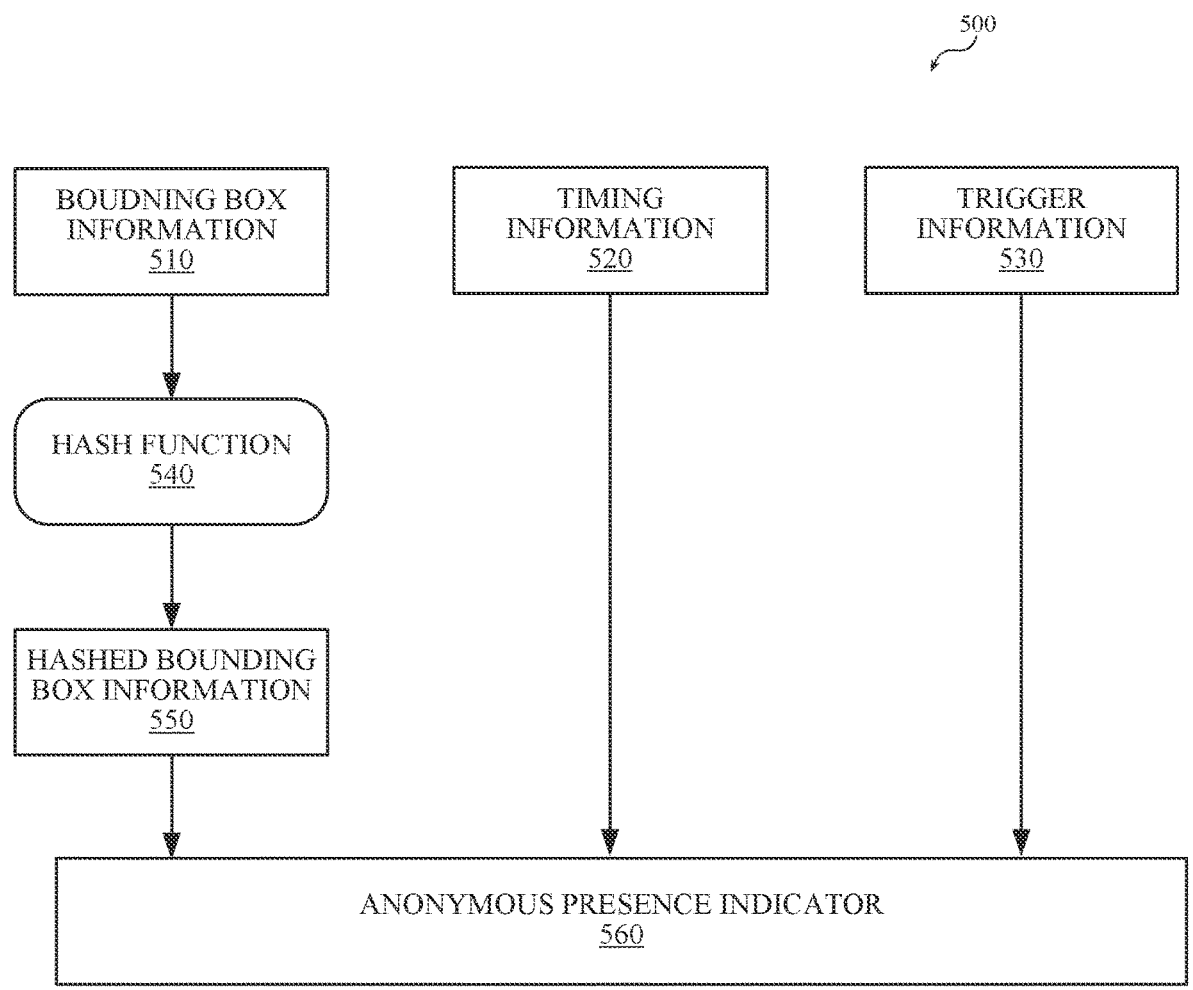
FIG. 5 is a diagram of an example process for generating an anonymous presence indicator according to one or more implementations described herein.

FIG. 5 is a diagram of an example process 500 for generating an anonymous presence indicator according to one or more implementations described herein. Process 500 may be implemented by UE 210. In some implementations, some or all of process 500 may be performed by one or more other systems or devices, including one or more of the devices of FIG. 2. Additionally, process 500 may include one or more fewer, additional, differently ordered and/or arranged operations than those shown in FIG. 5.

As shown, UE 210 may generate anonymous presence indicator 550 based on one or more types of information, such as bounding box information 510, timing information 520, and trigger information 530. In some implementations, bounding box information 510 used to generate anonymous presence indicator 550 may be selected to identify the bounding box where UE 210 is located. In some implementations, this may include some or all of the bounding box geo-definition information (e.g., a set of longitudes, latitudes, and/or other information describing or defining the geographic area of the bounding box). In some implementations, this may also, or alternatively, include a bound box identifier that uniquely identifies a bounding box from among other bounding boxes.

Timing information 520 may include one or more types of information relating to the anonymous geospatial popularity evaluation techniques described herein. For example, timing information 520 may include a time, or duration of time relating to, UE 210 receiving bounding box information from bounding box server 270, UE 210 detecting entry into a bounding box, UE 210 detecting an event trigger, UE 210 reporting anonymous presence indicator 560 to bounding box server 270, etc. In some implementations, timing information 520 may include a duration of time beginning with the detection of entry into a bounding box or event trigger and ending with an expiration of a re-report timer. For example, if UE 210 detected entry into a bounding box at noon (12:00 PM) and the re-report timer is 1 hour, UE 210 may determine that timing information 520 is 12:00 PM to 1:00 PM. Timing information may also, or alternatively, include other types of information, such as a day of the week, month, year, date, etc. Including timing information 520 in anonymous presence indicator 560 may better enable bounding box server 270 to evaluate and determine the geospatial popularity of a bounding box with greater precision (e.g., how a quantity of UEs 210 in a given bounding box may change over time).

Trigger information 530 may include one or more types of information relating to the prompt or reason for which the anonymous presence indicator 560 is being reported to bounding server 270. For example, when UE 210 is reporting anonymous presence indicator 560 in response to entering a bounding box, trigger information 530 may include an indication of UE 210 having entered a bounding box. By contrast, when UE 210 is reporting anonymous presence indicator 560 in response to expiration of a re-report timer, trigger information 530 may include an indication of the re-report timer having expired. When a trigger event includes a condition other than, or in addition to, UE 210 entering a bounding box or a re-report timer expiring, such as UE 210 making a call, sending or receiving a type of message, etc., UE 210 may trigger information may include an indication of such a trigger event as well. For example, when a trigger event for a bounding box includes making a call within a newly entered bounding box, trigger information may include an indication of entry into the bounding box and/or the call being made.

Including trigger information 520 in anonymous presence indicator 560 may better enable bounding box server 270 to evaluate geospatial popularity with greater precision by indicating how UEs 210 may interact with a bounding box and what UEs 210 may do therein. For example, a bounding box with a high volume of anonymous presence indicators 560 due to bounding box entries but very few anonymous presence indicators 560 due to re-report timer expirations may suggest that UEs 210 enter and exit the bounding box quickly rather quickly, which may suggest a high traffic area. As another example, a bounding box with a low volume of anonymous presence indicators 560 from bounding box entries but many anonymous presence indicators 560 due to re-report timer expirations may suggest that while UEs 210 may rarely enter the bounding box, those that do spend considerable time there, which may suggest a residential area. In another example, a bounding box with a moderate volume of anonymous presence indicators 560 due to bounding box entry and re-report timer expiration, but a high volume of video streaming event triggers may suggest that UEs 210 in the bounding box tend to place a high demand on wireless network bandwidth. In another example, a bounding box with a moderate volume of anonymous presence indicators 560 due to bounding box entry and re-report timer expiration, but a high volume of financial purchase event triggers may suggest that the bounding box is an area that is popular for commercial activity. As such, including trigger information in anonymous presence indicators 560 may enable evaluation of why and how an area may have a particular geospatial popularity.

As shown, UE 210 may apply a hash function 540 to bounding box information 510 and produce hashed bounding box information 550. In some implementations, the hash function 540 may have been received, updated, etc., from bounding box server 270. In some implementations, the hash function may also, or alternatively, have been installed on UE 210 during production, available as part of an operating system or application of UE 210, or acquired in another manner. Hashed bounding box information 550 may provide a secure way for UE 210 to include bounding box identification information in anonymous presence indicator 560. UE 210 may include hashed bounding box information 550, timing information 520, and trigger information 530 in anonymous presence indicator 560, which may be sent to bounding box server 270 to facilitate and enable evaluation of geospatial popularity of the corresponding bounding box. Accordingly, anonymous presence indicator 560 may include bounding box information to identify the bounding box, timing information to indicate when the anonymous presence indicator 560 was generated, and trigger information 530 to indicate why anonymous presence indicator 560 was generated.

Figure 6:
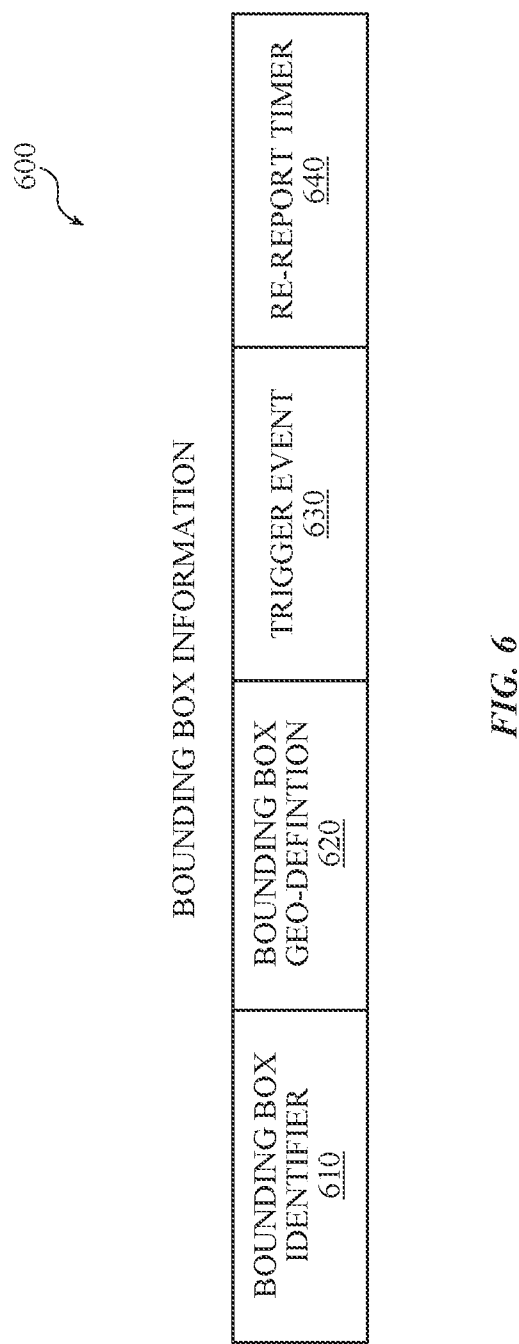
FIG. 6 is a diagram of an example data structure of bounding box information according to one or more implementations described herein.

FIG. 6 is a diagram of an example data structure 600 of bounding box information according to one or more implementations described herein. As shown, data structure 600 may include bounding box identifier 610, bounding box geo-definition 620, trigger event 630, re-report timer 640. Data structure 600 may be, in whole or in part, stored by bounding box server 270, communicated to UE 210, stored by UE 210, and/or used by UE 210 to implement one or more of the techniques described herein. In some implementations, data structure 600 may include one or more fewer, additional, differently ordered, and/or arranged types of information than those shown in FIG. 6. For example, in some implementations, one or more of the types of information of data structure 600 may be communicated to UE 210 at different times and/or via different messages. Similarly, to implement one or more of the techniques described herein, UE 210 may store and/or use one or more types of information that differs from example structure 600. As such, example data structure 600 is provided as a non-limiting example of information that may be used to implement one or more of the techniques described herein.

Bounding box identifier 610 may include one or more types of information configured to uniquely identify a bounding box from one or more other bounding boxes. In some implementations, each bounding box for which popularity information is to be anonymously collected may be associated or represented by a bounding box identifier 610, which may be an alphanumeric sequence selected for identifying a particular bounding box. As described herein, bounding box identifier 610 may be used by UE 210 to provide anonymous presence indicators in such a manner as to enable bounding box server 270 to properly store anonymous presence indicators according to bounding boxes for geospatial analysis and evaluation. In some implementations, one or more other types or combinations of information may be used to identify bounding boxes, including bounding box geo-definition 620.

Bounding box geo-definition 620 may include one or more types of information configured to define or describe the actual geographic attributes of a bounding box. In some implementations, bounding box geo-definition 620 may include sets of geographic coordinates (e.g., longitudes and latitudes) that may be logically connected to define a geographic area of a bounding box. In some implementations, bounding box geo-definition 620 may also, or alternatively, include other types or combinations of information related to geographic locations, such as locations of points of interest, venues, base stations or other network nodes, portions and/or combinations of base station coverage areas, etc. In some implementations, bounding box geo-definition 620 may include a reference source whereby UE 210 may obtain information defining a geographic area of a bounding box.

Trigger event 630 may include one or more types of information configured to describe, define, identify, or reference an event or condition detectable by UE 210. As described herein, examples of a trigger event may include UE 210 detecting entry of a bounding box, initiation or participation in a voice and/or video call, execution of a purchase or financial transaction, entry or arrival at a specified location (e.g., a store, library, museum, stadium, theater, etc.) withing the bounding box, and so on. Additional examples of a trigger event may include a condition of UE 210, including a specified availability of processing, memory, or bandwidth capacity; a condition of network conditions relating to UE 210, including an availability of wireless resources, a level of network congestion, etc. Additional examples of a trigger event may include a call initiated or received by UE 210, a text message sent or received by UE 210, execution of a specified feature or service of an operating system of UE 210, execution of a specified application of UE 210, transmission or reception of a specified message, prompt, or other information received from base station 222 and/or originating from bounding box 270. Accordingly, a trigger event as described herein may include one or more, or a combination of conditions detectable by UE 210.

Re-report timer 640 may include one or more types of information configured described a duration of time for which UE 210 is to wait before transmitting an anonymous presence indicator to bounding box server 270. Depending on the implementation or scenario, re-report timer 640 may include a quantity of seconds, minutes, hours, days, etc. For example, after UE 210 sends an anonymous presence indicator to bounding box server 270, UE 210 may be configured to wait a period of time before sending another anonymous presence indicator for the same bounding box. Doing so may ensure that a reasonable amount of UE and network resources are allocated to enabling geospatial popularity evaluation in addition to ensuring that the geospatial popularity techniques described herein are implemented with a target or appropriate level of granularity (e.g., by preventing UE 210 from sending an unnecessary or unhelpful quantity of anonymous presence indicators for the same bounding box over a period of time). This may also, or alternatively, provide a configurable amount of anonymity (for example if they system were configured to send an indicator every second, it could be determined to the second how long UE 210 was in a bounding box, whereas if it were set to every hour, it could be determined to the hour how long UE 210 was in a bounding box.

Figure 7:
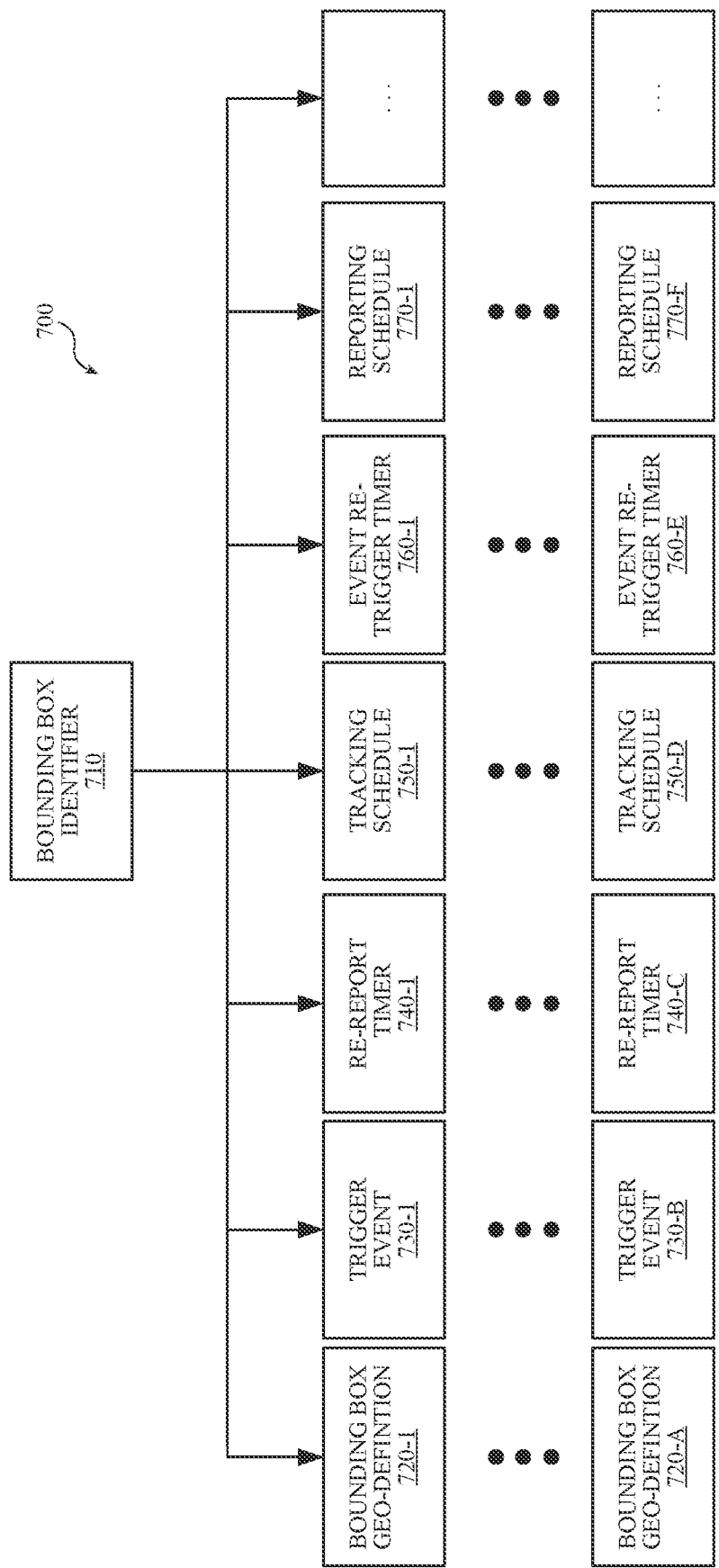
FIGS. 7-9 are diagrams of examples of data structures of bounding box information according to one or more implementations described herein.
Figure 8:
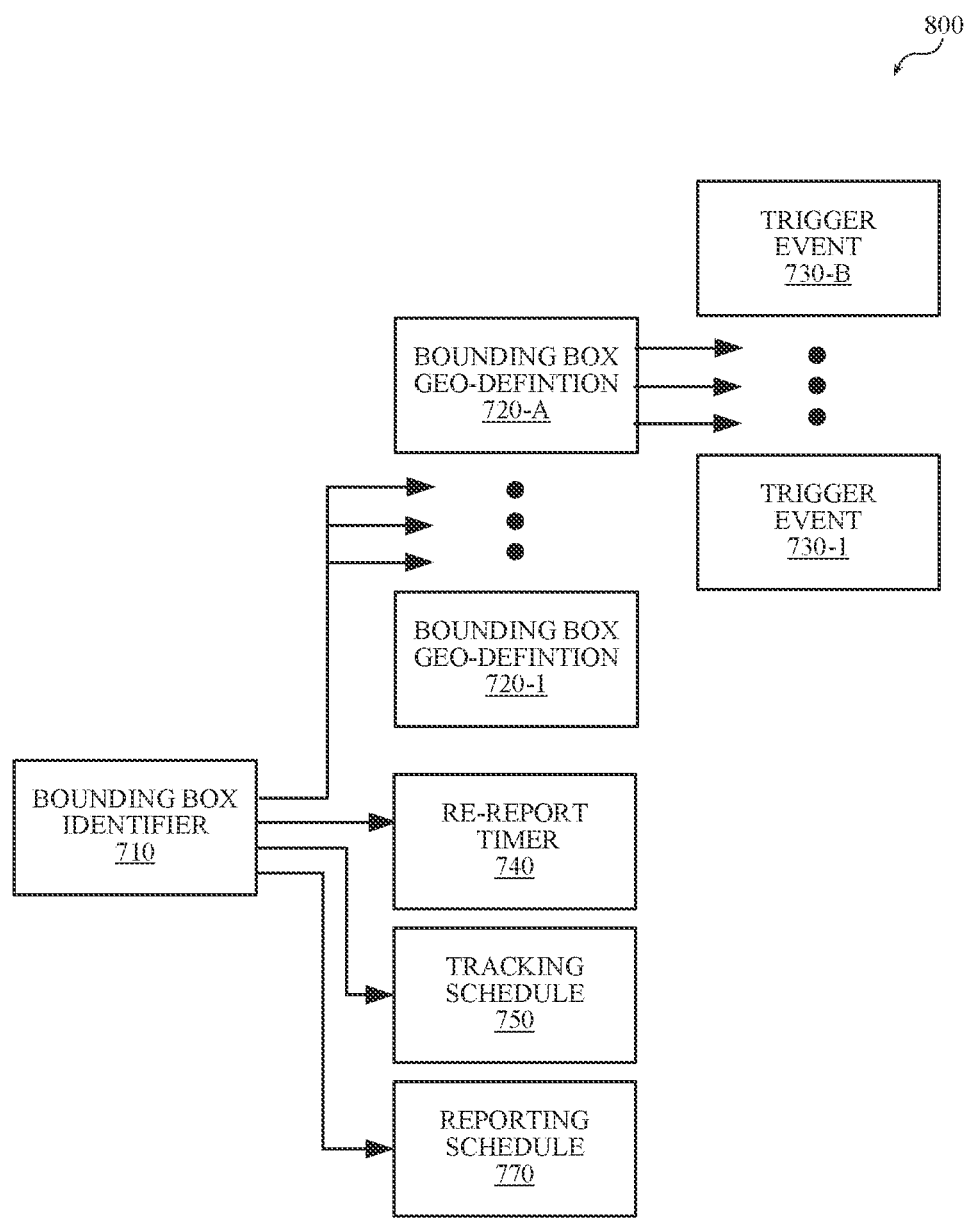
Figure 9:
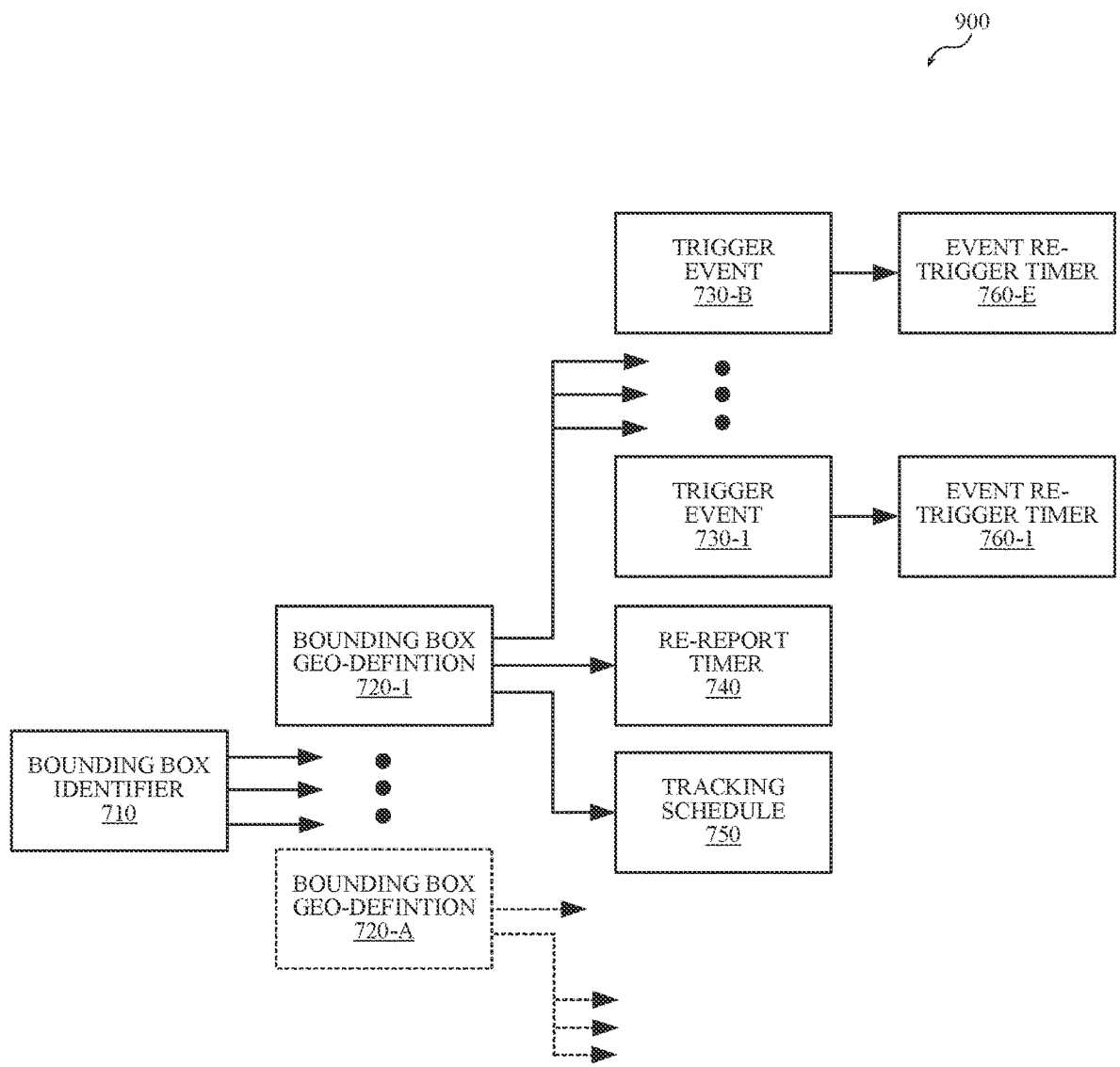

FIGS. 7-9 are diagrams of examples of data structures 700, 800, and 900 (referred to collectively as "data structures 700-900") of bounding box information according to one or more implementations described herein. Relative to the more simplified example of FIG. 6, data structure 700 may include a broader example of the types of information that may be included in bounding box information as described herein. Further, data structures 800 and 900 may include more specific examples of arrangements and inter-relationships of the bounding box information described in FIG. 7.

Additionally, any of data structures 700-900 may be stored by bounding box server 270, communicated to UE 210, stored by UE 210, and/or used by UE 210 to implement one or more of the techniques described herein. In some implementations, any of data structures 700-900 may include one or more fewer, additional, differently ordered, and/or arranged types of information than those shown in FIGS. 7-9. For example, in some implementations, some of the types of information of any of data structures 700-900 may be communicated to UE 210 at different times and/or via different messages. Similarly, to implement one or more of the techniques described herein, UE 210 may store and/or use one or more types of information that differs from example structures 700-900. As such, data structures 700-900 are provided as non-limiting examples of information that may be used to implement one or more of the techniques described herein.

Referring to FIG. 7, example data structure 700 may include one or more types of information including bounding box identifier 710, bounding box geo-definitions 720-1 through 720-A (where A is greater than 1 and collectively referred to as "bounding box geo-definitions 720"), trigger events 730-1 through 730-B (where B is greater than 1 and collectively referred to as "trigger events 730"), and re-report timers 740-1 through 740-C (where C is greater than 1 and collectively referred to as "trigger events 740"). As further shown, example data structure 700 may also, or alternatively, include tracking schedule 750-1 through 750-D (where D is greater than 1 and collectively referred to as "tracking schedules 750"), event re-trigger timer 760-1 through 760-E (where E is greater than 1 and collectively referred to as "event re-trigger timers 760"), and reporting schedule 770-1 through 770-F (where F is greater than 1 and collectively referred to as "tracking schedules 770").

Bounding box identifier 710 is described above with reference to bounding box identifier 610 of FIG. 6. As shown in FIG. 7, bounding box identifier 710 may be logically associated with one or more types of additional information, such as multiple bounding box geo-definitions 720, trigger events 730, and re-report timers 740, in addition to one or more tracking schedules 750, event re-trigger timers 760, and reporting schedules 770. FIGS. 8-9 provide examples of such implementations.

Bounding box geo-definitions 720 are generally described above with reference to bounding box 610 of FIG. 6. As shown in FIG. 7, bounding box identifier 710 may be associated with multiple bounding box geo-definitions 720. In some implementations, this may enable UE 210 to monitor a current location of UE 210 with respect to multiple bounding boxes. In some implementations, the bounding boxes may be geographically separated (e.g., by geographical space not associated with a bounding box), geographically adjacent, geographically overlapping (e.g., with a portion of each bounding box covering a common geographic area), or geographically nested (e.g., where the geographic area of one bounding box is located entirely within the geographic area of another bounding box). In scenarios where UE 210 is currently located in an area of overlapping or nested bounding boxes, UE 210 may be configured to report an anonymous presence indicator for each bounding box, an anonymous presence indicator for only one bounding box (e.g., a bounding box designated as a dominant bounding box, a bounding box of greatest priority, a bounding box not yet reported, etc.).

Additionally, or alternatively, in scenarios involving overlapping or nested bounding boxes, UE 210 may determine which bounding box to report based on one or more criteria, such as the bounding box defining the largest geographic area, the bounding box defining the smallest geographic area, a distance between each bounding box and another bounding box or other type of point of interest, a creation date of each bounding boxes (e.g., the oldest or most recently defined bounding box), etc. Additionally, or alternatively, UE 210 may determine which bounding box to report based on a type of trigger event detected by UE 210, whether a re-reporting timer is ongoing or has expired for one of the overlapping or nested bounding boxes, a reporting schedule (e.g., scheduling information that describes which bounding box should be monitored and reported at different times, days, dates, etc.), an amount of time UE 210 has spent in each bounding box (e.g., a preference to report recently entered bounding boxes or vice versa), or another type of criteria or condition.

Trigger events 730 are generally described above with reference to trigger event 630 of FIG. 6. As shown in FIG. 7, bounding box identifier 710 may be associated with multiple trigger events 730. In some implementations, this may enable UE 210 to report anonymous presence indicators based on multiple events and/or response to different events. For example, in some implementations UE 210 may be configured with multiple trigger events, such that UE 210 may report an anonymous presence indicator for a bounding box upon entry into the bounding box, upon detecting a first operation while in the bounding box (e.g., making a call), and upon detecting a second operation (e.g., executing a financial transaction) while in the bounding box. Alternatively, UE 210 may be configured with multiple trigger events, such that UE 210 may report an anonymous presence indicator for a bounding box after detecting more than one or all of the trigger events (e.g., after entering the bounding box, making a call while in the bounding box, and executing a financial transaction while in the bounding box). In another example, each trigger event may be associated with, or otherwise depend upon, UE 210 being within a particular location or area (e.g., in a nested bounding box) within the bounding box. For example, a trigger event of making a call may only qualify as a trigger event if/when UE 210 is located at a particular location within the bounding box.

Re-report timers 740 are generally described above with reference to re-report timer 640 of FIG. 6. As shown in FIG. 7, bounding box identifier 710 may be associated with multiple trigger events 730. In some implementations, each bounding box may be associated with a re-report timer. In some implementations, nested or areas of overlapping bounding boxes may have a re-report timer associated therewith, such that UE 210 may trigger the re-report timer upon reporting an anonymous presence indicator for the nested bounding box or the area of overlapping bounding boxes. In such implementations, non-overlapping areas of the bounding boxes may be associated with different re-report timers 740.

As shown in FIG. 7, bounding box identifier 710 may be associated with one or more tracking schedules 750. A tracking schedule 750 may include times, days, dates, etc., during which UE 210 may monitor for entry into one or more bounding boxes. For example, a track schedule 750 may indicate that UE 210 is to monitor and report entry into one or more bounding boxes during a particular time of day, day(s) of the week, and/or date or ranges of dates. In some implementations, a tracking schedule 750 may pertain to one bounding box or more than one bounding boxes. Similarly, other tracking schedules 750 may pertain to one or more other bounding boxes. As such, UE 210 may be configured to verify whether to report an anonymous presence indicator for a bounding box based on a tracking schedule associated with the bounding box.

As shown in FIG. 7, bounding box identifier 710 may be associated with one or more event re-trigger timers 760. An event re-trigger timer 760 may include one or more types of information configured described a duration of time for which UE 210 is to wait before monitoring for a trigger event associated with the re-trigger timer. Depending on the implementation or scenario, re-trigger timer 760 may include a quantity of seconds, minutes, hours, days, etc. For example, after UE 210 sends an anonymous presence indicator to bounding box server 270, which involved a trigger event other than entry into the bounding box, UE 210 may be configured to wait a period of time, based on the re-trigger timer associated with the trigger event, before monitoring for the same type of trigger event.

Enabling trigger events to be associated with trigger re-report timers may enable UE 210 to report anonymous presence indicators for a bounding box at rates that vary depending on different trigger events. For example, the trigger events for a particular bounding box may include UE 210 entering the bounding box, connecting to a particular base station 222 while in the bounding box, and initiating a video call while in the bounding box. Each trigger event may be associated with different event re-trigger timers 760. As such, UE 210 may be configured to send an anonymous presence indicator in response to UE 210 entering the bounding box, send another anonymous presence indicator in response to UE 210 connecting to base station 222, and send yet another anonymous presence indicator in response to initiating a video call. As each trigger may be associated with a different event re-trigger timer 760, UE 210 may resume monitoring and reporting for each trigger event at different times. Enabling trigger events to be associated with different event re-trigger timers 760 may enable anonymous presence indicators to be monitored and reported in accordance with a designated significance of a particular condition or trigger in terms of evaluating geospatial popularity of bounding boxes.

As shown in FIG. 7, bounding box identifier 710 may be associated with one or more event reporting schedules 770. A reporting schedule may include times, days, dates, etc., during which UE 210 may send anonymous presence indicators to bounding box server 270. For example, UE 210 may be configured to monitor and generate anonymous presence indicators in accordance with tracking schedule 750. And prior to sending an anonymous presence indicator to bounding box 270, UE 210 may determine whether doing so would be in accordance with an event reporting schedule 770. When event reporting schedules 770 indicates that reporting is permitted, UE 210 may proceed to send the anonymous presence indicator to bounding box 270. When event reporting schedule 770 indicates that reporting is not permitted, UE 210 may store the anonymous presence indicator locally. In such a scenario, UE 210 may periodically check whether reporting is permitted by event reporting schedule 770 and send the anonymous presence indicator when permitted.

In some implementations, instead of periodically checking whether reporting is permitted, UE 210 may schedule transmission of the anonymous presence indicator when the anonymous presence indicator is initially stored. In some implementations, event reporting schedules 770 may also, or alternatively, be associated with one or more trigger events, such that anonymous presence indicators for different trigger events may be reported at different times. In some implementations, UE 210 may be configured to report anonymous presence indicators in response to a request to do so from bounding box server 270. Event reporting schedules 770 may enable bounding box server 270 to receive anonymous presence indicators in accordance with a predefined schedule and/or receive different anonymous presence indicators at different times.

FIG. 8 is a diagram of an example data structure 800 of bounding box information associated with a particular bounding box. As shown, data structure 800 may include bounding box identifier 710, bounding box geo-definitions 720, trigger events 730, re-report timer 740, tracking schedule 750, and reporting schedule 770. In contrast to FIG. 7, data structure 800 does not include any event re-trigger timers 760.

In accordance FIG. 8, an example bounding box may be represented or identified based on bounding box identifier 710. This particular bounding box may include multiple bounding box geo-definitions 720-1 through 730-A. For purposes of explaining FIG. 8, assume that bounding box geo-definitions 720-1 through 730-A represent a first bounding box geo-definition 720-1 and a second bounding box geo-definition 720-A. Assume also that bounding box geo-definition 720-1 may indicate the area of the bounding box and bounding box geo-definition 720-A may indicate a nested bounding box (e.g., a bounding box located within the bounding box indicated by bounding box geo-definition 720-1).

Prior to monitoring for entry into the bounding boxes of bounding box geo-definitions 720, UE 210 may determine whether doing so is consistent with tracking schedule 750. If so, UE 210 may begin monitoring a current location of UE 210 relative to a geographic area indicated by bounding box geo-definitions 720. For purposes of explaining FIG. 8, assume that tracking schedule 750 indicates that UE 210 should monitor for bounding box geo-definitions 720.

As shown, bounding box geo-definition 720-1 may not include any trigger events, such that UE 210 may default to reporting an anonymous presence indicator for the bounding box upon entry into the bounding box. Additionally, UE 210 may re-report an anonymous presence indicator for the bounding box of bounding box geo-definition 720-1 upon expiration of re-report timer 740 associated with bounding box identifier 710. To generate the anonymous presence indicator UE 210 may hash bounding box geo-definition 720-1 as described above with reference to FIG. 5. Alternatively, UE 210 may generate the anonymous presence indicator based on bounding box identifier 710.

In contrast to bounding box geo-definition 720-1, bounding box geo-definition 720-A may be associated with multiple trigger events 730. For purposes of explaining FIG. 8, assume that trigger events 730-1 through 730-B represent two or more trigger events. Assume also that trigger events 730 share a dependent relationship, such that UE 210 is configured to report an anonymous presence indicator after detecting all of trigger events 730. As such, UE 210 may report an anonymous presence indicator for the nested bounding box upon entry into the area indicated by bounding box geo-definition 720-A and detection of one or more trigger events 730. As such, UE 210 may report an anonymous presence indicator for the nested bounding box upon entry into the area indicated by bounding box geo-definition 720-A and detection of one or more trigger events 730. In other implementations, trigger events 730 may be independent, such that UE 210 is configured to report an anonymous presence indicator after detecting any one of the trigger events. To generate the anonymous presence indicator, UE 210 may hash bounding box geo-definition 720-A as described above with reference to FIG. 5.

As trigger events 730 are not associated with an event re-trigger timer 760, UE 210 may initiate an instance of re-report timer 740 for bounding box geo-definition 720-A, and refrain from monitoring for trigger events 730 and from re-reporting an anonymous presence indicator for bounding box geo-definition 720-A until after expiration thereof. Prior to sending an anonymous presence indicator to bounding box server 270, UE 210 may determine whether doing so is consistent with reporting schedule 770. As reporting schedule 770 is logically associated with bounding box identifier 710 (e.g., instead of a reporting schedule being associated with each of bounding box geo-definitions 720), anonymous presence indicators for any of bounding box geo-definitions 720 may only be reported in accordance with reporting schedule 770. When reporting an anonymous presence indicator is consistent with reporting schedule 770, UE 210 may proceed to send the indicator to bounding box server 270. When reporting an anonymous presence indicator is not consistent with reporting schedule 770, UE 210 may store the anonymous presence indicator until reporting schedule 770 indicates that the indicator is to be sent.

FIG. 9 is a diagram of an example data structure 900 of bounding box information associated with a particular bounding box. As shown, data structure 900 may include bounding box identifiers 710, bounding box geo-definitions 720, trigger events 730, re-report timer 740, tracking schedule 750, and event re-trigger timers 760. In contrast to FIG. 7, data structure 800 does not include any event re-trigger timers 760. In contrast to FIG. 7, data structure 800 does not include any reporting schedules 770. As described below, most of the types of information represented in FIG. 9 are in relation to bounding box geo-definition 720-1 bounding box geo-definition 720-A. Nevertheless, bounding box geo-definition 720-A is depicted to indicate that bounding box geo-definition 720-A may include logical associations with any variety and arrangement of data types that may be similar, or different, to bounding box geo-definition 720-1.

Bounding box identifier 710 may identify a particular bounding box and may be logically associated with multiple bounding box geo-definitions 720. For purposes of explaining FIG. 9, assume that bounding box geo-definitions 720 represent a first bounding box geo-definition 720-1 and a second bounding box geo-definition 720-A. Assume also that bounding box geo-definition 720-1 may indicate the area of a bounding box and bounding box geo-definition 720-A may indicate a nested bounding box (e.g., a bounding box located within the bounding of bounding box geo-definition 720-1) or an area of bounding box geo-definition 720-1 that overlaps with a bounding box represented by another bounding box identifier (not show).

Prior to monitoring for entry into the bounding box of bounding box geo-definitions 720-1, UE 210 may determine whether doing so is consistent with tracking schedule 750 associated with bounding box geo-definitions 720-1. If so, UE 210 may begin monitoring a current location of UE 210 relative to a geographic area indicated by bounding box geo-definition 720-1. For purposes of explaining FIG. 9, assume that tracking schedule 750 indicates that UE 210 is to monitor for bounding box geo-definition 720-1.

As shown, bounding box geo-definition 720-1 may be associated with multiple trigger events 730. For purposes of explaining FIG. 8, assume that trigger event 730-1 represents a phone call involving UE 210 and that trigger event 730-B represents a financial transaction. Assume also that no trigger event 730 is associated with initial entry into the bounding box of bounding box geo-definition 720-1, and thus UE 210 may therefore be configured to default reporting an anonymous presence indicator upon entry into the bounding box. Additionally, UE 210 may be configured to initiate a re-report timer based on re-report timer 740 directly associated with bounding box geo-definition 720-1. As such, UE 210 may not re-report an anonymous presence indicator for mere presence within bounding box geo-definition 720-1 until after re-report timer 740 has expired.

UE 210 may, however, continue monitoring for trigger events 730 regardless of re-report timer 740. For purposes of explaining FIG. 9, assume that UE 210 engages in a phone call (trigger event 730-1) and/or executes a financial transaction (trigger event 730-B) while still within the geographic area indicated by bounding box geo-definition 720-1. In response to such an event, UE 210 may be configured to generate and communicate an anonymous presence indicator to bounding box server 270 regarding the event(s). Additionally, UE 210 may initiate event re-trigger timers 760 based on the trigger events detected. As described herein, event re-trigger timers 760 may cause UE 210 to refrain from monitoring for a corresponding trigger event 730 until the event re-trigger timer 760, associated therewith, has expired.

In some implementations, UE 210 resuming the monitoring for a particular trigger event 730 may be independent of whether re-report timer 740 is ongoing or has expired. For example, in an independent type of scenario, UE 210 may postpone the monitoring of a trigger event 730 until the re-trigger timer 760 associated with the trigger event 730 has expired, regardless of the status of the re-report timer 740. In some implementations, UE 210 resuming the monitoring for a particular trigger event 730 may be dependent on whether re-report timer 740 is ongoing or has expired. For example, in a dependent scenario, UE 210 may postpone the monitoring of a trigger event until both the event re-trigger timer associated with the trigger event and the re-report timer associated with the bounding box geo-definition 720 have expired. In some implementations, whether a trigger event 730 and corresponding event re-trigger timer 760 is dependent or independent may vary from one trigger event to another. For instance, in some implementations, UE 210 resuming the monitoring of trigger event 730-1 may be dependent on the expiration of both event re-trigger timer 760-1 and expiration of re-report timer 740, where as UE 210 resuming the monitoring of trigger event 730-B may only depend on the expiration of event re-trigger timer 760-E. Further, a duration of re-report timer 740, event re-trigger timer 760-1, and event re-trigger timer 760-E may be the same, similar, or different.

Figure 10:
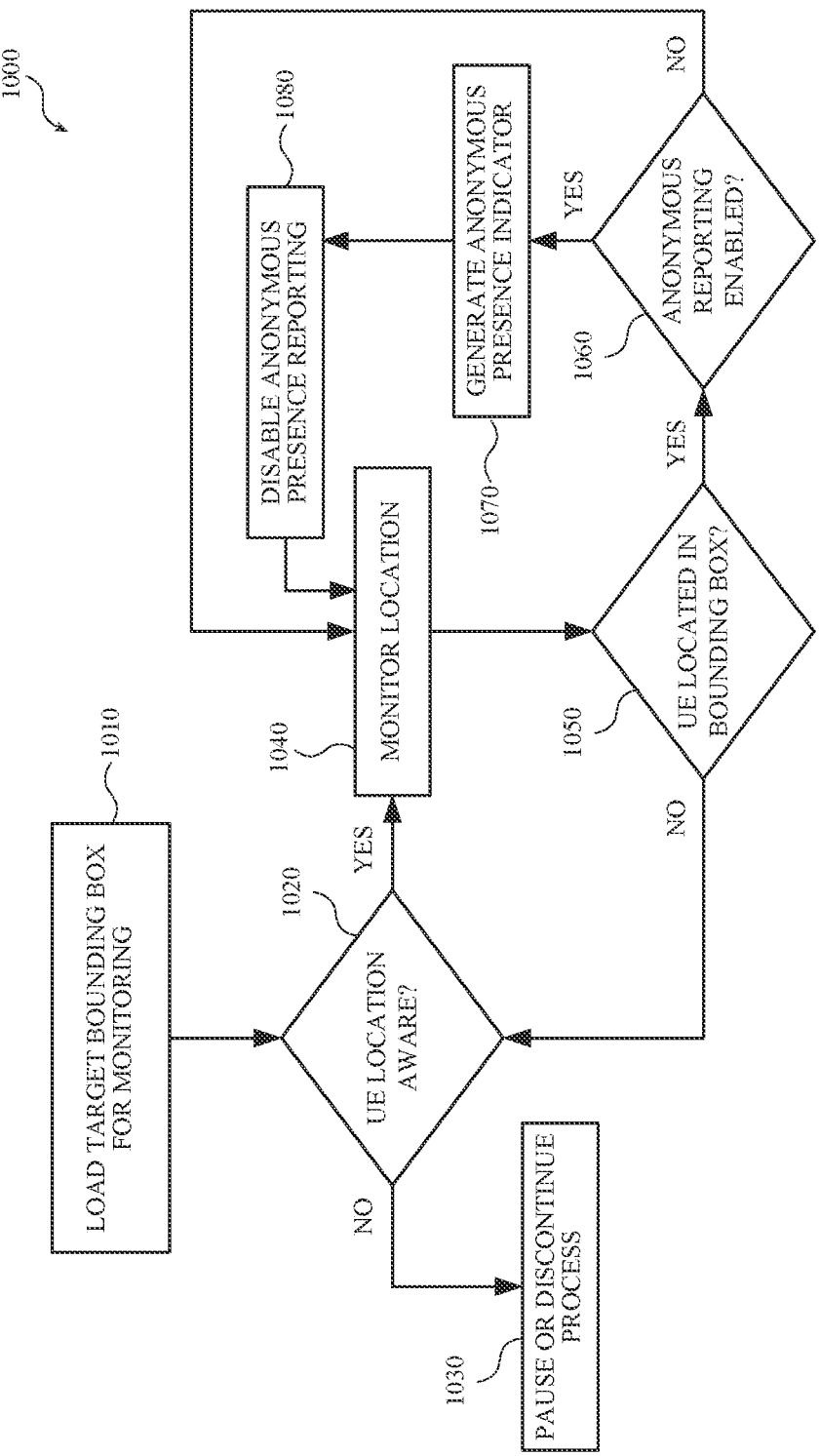
FIG. 10 is a diagram of an example process for generating an anonymous presence indicator according to one or more implementations described herein.

FIG. 10 is a diagram of an example process 1000 for generating an anonymous presence indicator according to one or more implementations described herein. Process 1000 may be implemented by UE 210. Process 1000 may be implemented by UE 210. In some implementations, some or all of process 1000 may be performed by one or more other systems or devices, including one or more of the devices of FIG. 2. Additionally, process 1000 may include one or more fewer, additional, differently ordered and/or arranged operations than those shown in FIG. 10. In some implementations, some or all of the operations of process 1000 may be performed independently, successively, simultaneously, etc., of one or more of the other operations of process 1000. As such, the techniques described herein are not limited to a number, sequence, arrangement, timing, etc., of the operations or process depicted in FIG. 10. Additionally, an implementation involving one or more of the operations of process 1000 may include one or more operations or functions described herein.

As shown, UE 210 may be configured to load a target bounding box for monitoring (block 1010). For example, upon receiving bounding box information (and/or upon another or an additional prompt) UE 210 may begin load information regarding one or more bounding boxes into a local memory of UE 210 for processing and analysis. Additionally, or alternatively, UE 210 may verify whether UE 210 is locationally aware (block 1020). In some implementations, being locationally aware may include an ability of UE 210 to determine a geographic location of UE 210 and/or one or more geographic areas based upon bounding box information. When UE 210 is not location aware (block 1020—No), process 1000 may proceed by pausing and/or discontinuing process 1000 (block 1030). When UE 210 is location aware (block 1020—Yes), process 100 may proceed by monitoring a location of UE 210 (block 1040).

Process 1000 further include UE 210 determining or detecting when UE 210 is located in a bounding box (block 1050). And when UE 210 is not located in a bounding box (block 1050—No) process 1000 may proceed by returning to a determination of whether UE 210 is location aware (block 1020). When UE 210 is located in a bounding box (block (1050—Yes), process 1000 may proceed by UE 210 determining whether anonymous reporting is enabled (block 1060). When UE 210 is enabled for anonymous reporting (block 1060—Yes), process 1000 may include generating an anonymous presence indicator (block 1070) followed by disabling anonymous presence reporting (block 1080) for a duration specified by a re-report timer. Upon expiration of the re-report timer, process 1000 may include returning to monitoring a location of UE 210. As shown, when anonymous reporting is not enabled for UE 210 (block 1060), UE 210 may return to monitoring a location of UE 210 (block 1040) with respect to one or more bounding blocks).

Figure 11:
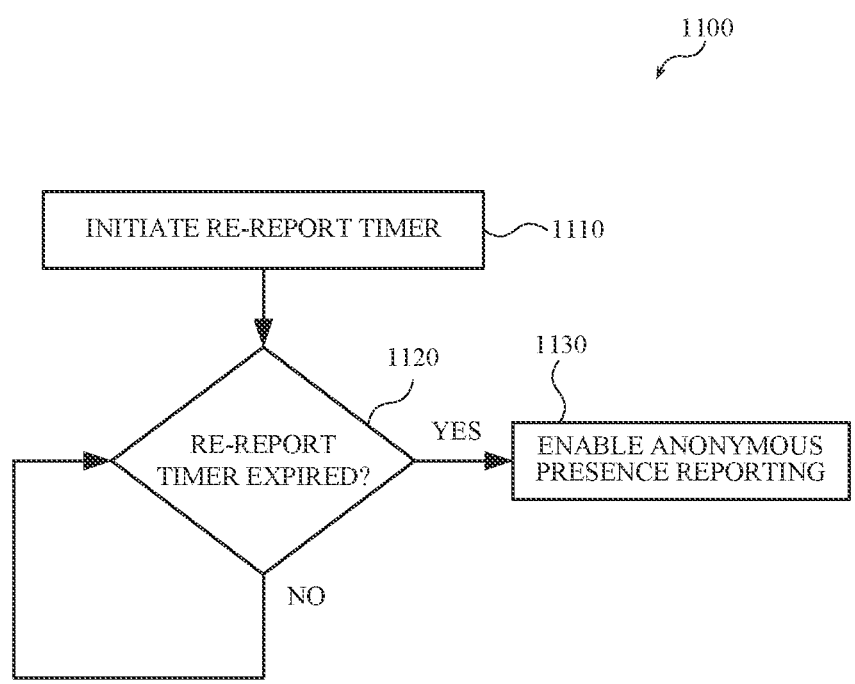
FIG. 11 is a diagram of an example process for implementing a re-report timer according to one or more implementations described herein.

FIG. 11 is a diagram of an example process for implementing a re-report timer according to one or more implementations described herein. Process 1100 may be implemented by UE 210. Process 1100 may be implemented by UE 210. In some implementations, some or all of process 1100 may be performed by one or more other systems or devices, including one or more of the devices of FIG. 2. Additionally, process 1100 may include one or more fewer, additional, differently ordered and/or arranged operations than those shown in FIG. 11. In some implementations, some or all of the operations of process 1100 may be performed independently, successively, simultaneously, etc., of one or more of the other operations of process 1100.

As such, the techniques described herein are not limited to a number, sequence, arrangement, timing, etc., of the operations or process depicted in FIG. 11. Additionally, an implementation involving one or more of the operations of process 1100 may include one or more operations or functions described herein. As shown, UE 210 may initiate a re-report timer (block 1110), which may be in response to generating and sending an anonymous presence indicator to boundary box server 270. At some point after initiating the re-report timer, UE 210 may also, or alternatively, determining whether the re-report timer has expired (block 1120). When the re-report timer has not expired (block 1120—No), UE 210 may continue monitoring whether the re-report timer has expired. When the re-report timer has expired (block 1120—Yes), UE 210 may proceed by enabling anonymous presence reporting (block 1130). In some implementations, process 1100, including enabling anonymous presence reporting (block 1130) may be operationally implemented in combination with process 1000, which may be consequential when UE 210 determines whether anonymous reporting is enabled or disabled (block 1060 of FIG. 10).

Figure 12:
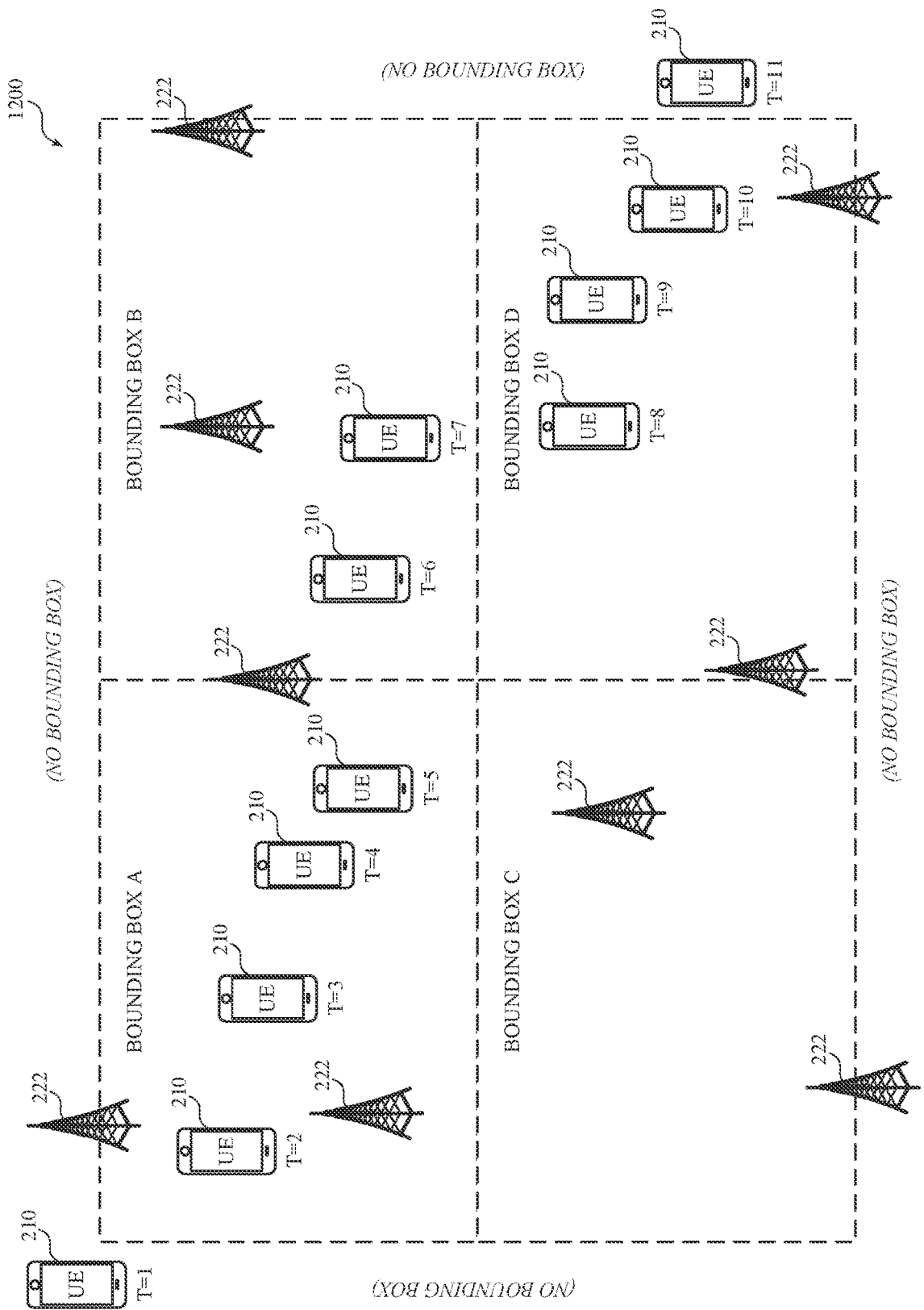
FIG. 12 is a diagram of an example implementation for anonymous geospatial popularity evaluation according to one or more implementations described herein.

FIG. 12 is a diagram of an example 1100 of anonymous geospatial popularity evaluation according to one or more implementations described herein. As shown, example 1100 may include UE 210, base station 222, and bounding boxes A through D (referred to collectively as "bounding boxes A-D"). FIG. 12 may also include value T, which may represent sequential moments in time indicated by T=1, T=2, and so on. Base stations 222 may represent networks nodes through which UE 210 may communicate with the network (e.g., via handoff procedures) as UE 210 changes locations.

UE 210 may initially be located in a no, or non, bounding box area, which is geographically outside bounding boxes A-D (at T=1). Upon entering bounding box, A (at T=2), UE 210 may generate and send an anonymous presence indicator for bounding box A to bounding box server 270 (not shown). UE 210 may also initiation a re-report timer during which UE 210 may not report another anonymous presence indicator for bounding box A to bounding box server 270. For purposes of explaining FIG. 12, assume that the duration of the re-report timer includes T=3 and T=4, during which UE 210 moves within bounding box A. Upon expiration of the re-report timer (at T=5), UE 210 may be configured to send another anonymous presence indicator for bounding box A to bound box server 270. Upon doing so, UE 210 may re-initiate the re-report timer for bounding box A, in addition to monitoring a location of UE 210 for entry into another bounding box.

As shown, represented by T=6, UE 210 may enter bounding box B. In response thereto, UE 210 may report an anonymous presence indicator for bounding box A to bounding box server 270 (not shown). UE 210 may also initiate a re-report timer associated with bounding box B, during which UE 210 may not retransmit another anonymous presence indicator for bounding box A to bounding box server 270. During the re-report timer, UE 210 may move to another location within bounding box B (at T=7) and later to bounding box D represented by T=8. UE 210 may detect entry into bounding box D, and in response thereto, report an anonymous presence indicator for bounding box D to bounding box server 270 (not shown). Upon reporting the anonymous presence indicator for bounding box D, UE 210 may initiation a re-report timer for bounding box D, during which UE 210 may move to locations represented by T=9 and T=10. The re-report timer for bounding box D by expire, at T=11, and UE 210 may resume monitoring for entry into bounding boxes A-D. However, as UE 210 may be located outside bounding boxes A-D (at T=11), UE 210 may not report any anonymous presence indicator to bounding box server 270.

Figure 13:
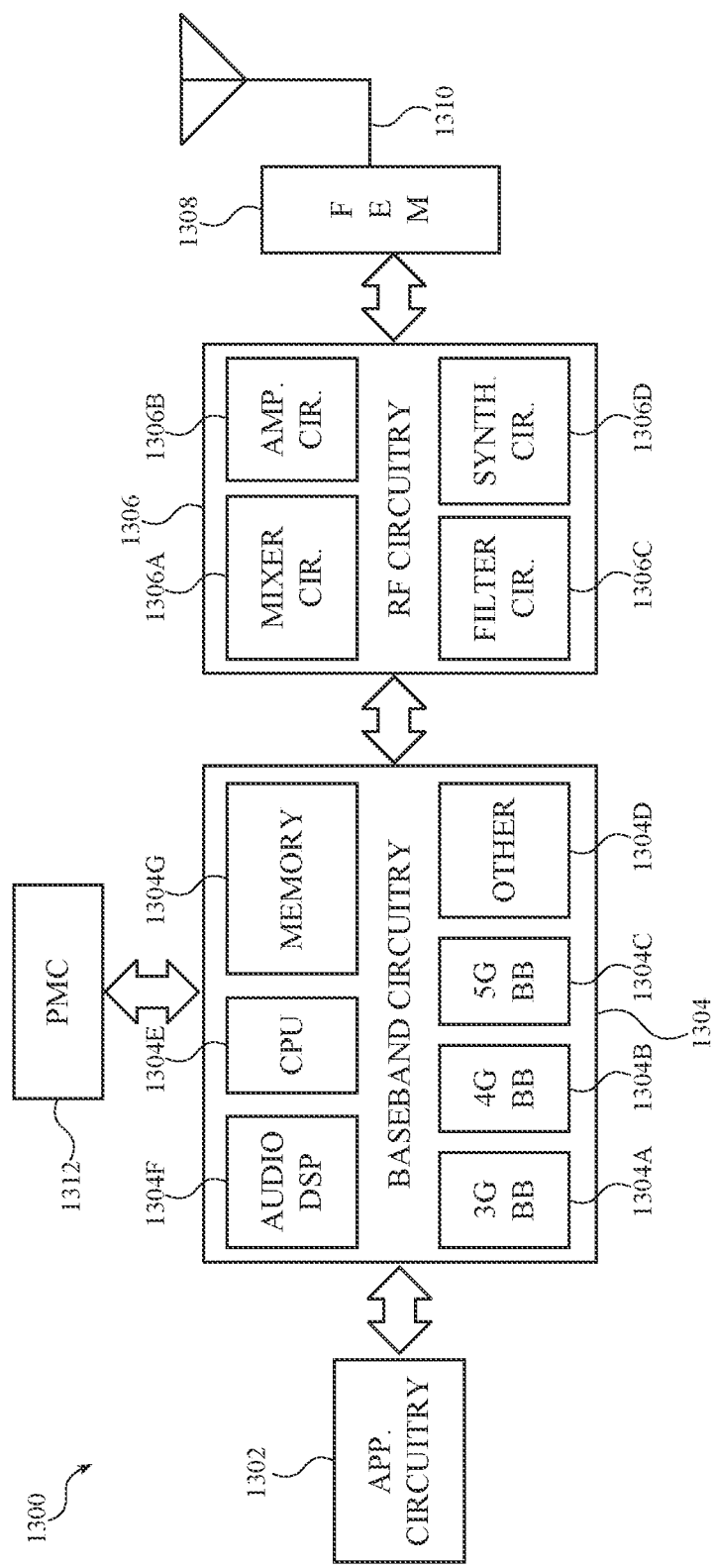
FIG. 13 is a diagram of an example of components of a device according to one or more implementations described herein.

FIG. 13 is a diagram of an example of components of a device according to one or more implementations described herein. In some implementations, the device 1300 can include application circuitry 1302, baseband circuitry 1304, RF circuitry 1306, front-end module (FEM) circuitry 1308, one or more antennas 1310, and power management circuitry (PMC) 1312 coupled together at least as shown. The components of the illustrated device 1300 can be included in a UE or a RAN node. In some implementations, the device 1300 can include fewer elements (e.g., a RAN node may not utilize application circuitry 1302, and instead include a processor/controller to process IP data received from a CN such as 5GC 130 or an Evolved Packet Core (EPC)). In some implementations, the device 1300 can include additional elements such as, for example, memory/storage, display, camera, sensor (including one or more temperature sensors, such as a single temperature sensor, a plurality of temperature sensors at different locations in device 1300, etc.), or input/output (I/O) interface. In other implementations, the components described below can be included in more than one device (e.g., said circuitries can be separately included in more than one device for Cloud-RAN (C-RAN) implementations).

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1300. In some implementations, processors of application circuitry 1302 can process IP data packets received from an EPC.

The baseband circuitry 1304 can include circuitry such as, but not limited to, one or more single-core or multi-core processors. The baseband circuitry 1304 can include one or more baseband processors or control logic to process baseband signals received from a receive signal path of the RF circuitry 1306 and to generate baseband signals for a transmit signal path of the RF circuitry 1306. Baseband circuitry 1304 can interface with the application circuitry 1302 for generation and processing of the baseband signals and for controlling operations of the RF circuitry 1306. For example, in some implementations, the baseband circuitry 1304 can include a 3G baseband processor 1304A, a 4G baseband processor 1304B, a 5G baseband processor 1304C, or other baseband processor(s) 1304D for other existing generations, generations in development or to be developed in the future (e.g., 5G, 6G, etc.). The baseband circuitry 1304 (e.g., one or more of baseband processors 1304A-D) can handle various radio control functions that enable communication with one or more radio networks via the RF circuitry 1306. In other implementations, some or all of the functionality of baseband processors 1304A-D can be included in modules stored in the memory 1304G and executed via a Central Processing Unit (CPU) 1304E. The radio control functions can include, but are not limited to, signal modulation/demodulation, encoding/decoding, radio frequency shifting, etc. In some implementations, modulation/demodulation circuitry of the baseband circuitry 1304 can include Fast-Fourier Transform (FFT), precoding, or constellation mapping/de-mapping functionality. In some implementations, encoding/decoding circuitry of the baseband circuitry 1304 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1304 can include one or more audio digital signal processor(s) (DSP) 1304F. The audio DSPs 1304F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1304 and the application circuitry 1302 can be implemented together such as, for example, on a system on a chip (SOC).

In some implementations, the baseband circuitry 1304 can provide for communication compatible with one or more radio technologies. For example, in some implementations, the baseband circuitry 1304 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various implementations, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some implementations, the receive signal path of the RF circuitry 1306 can include mixer circuitry 1306A, amplifier circuitry 1306B and filter circuitry 1306C. In some implementations, the transmit signal path of the RF circuitry 1306 can include filter circuitry 1306C and mixer circuitry 1306A. RF circuitry 1306 can also include synthesizer circuitry 1306D for synthesizing a frequency for use by the mixer circuitry 1306A of the receive signal path and the transmit signal path. In some implementations, the mixer circuitry 1306A of the receive signal path can be configured to down-convert RF signals received from the FEM circuitry 1308 based on the synthesized frequency provided by synthesizer circuitry 1306D. The amplifier circuitry 1306B can be configured to amplify the down-converted signals and the filter circuitry 1306C can be a low-pass filter (LPF) or band-pass filter (BPF) configured to remove unwanted signals from the down-converted signals to generate output baseband signals. Output baseband signals can be provided to the baseband circuitry 1304 for further processing. In some implementations, the output baseband signals can be zero-frequency baseband signals, although this is not a requirement. In some implementations, mixer circuitry 1306A of the receive signal path can comprise passive mixers, although the scope of the implementations is not limited in this respect.

In some implementations, the mixer circuitry 1306A of the transmit signal path can be configured to up-convert input baseband signals based on the synthesized frequency provided by the synthesizer circuitry 1306D to generate RF output signals for the FEM circuitry 1308. The baseband signals can be provided by the baseband circuitry 1304 and can be filtered by filter circuitry 1306C.

In some implementations, the mixer circuitry 1306A of the receive signal path and the mixer circuitry 1306A of the transmit signal path can include two or more mixers and can be arranged for quadrature down conversion and up conversion, respectively. In some implementations, the mixer circuitry 1306A of the receive signal path and the mixer circuitry 1306A of the transmit signal path can include two or more mixers and can be arranged for image rejection (e.g., Hartley image rejection). In some implementations, the mixer circuitry 1306A of the receive signal path and the mixer circuitry 1306A can be arranged for direct down conversion and direct up conversion, respectively. In some implementations, the mixer circuitry 1306A of the receive signal path and the mixer circuitry 1306A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode implementations, a separate radio IC circuitry can be provided for processing signals for each spectrum, although the scope of the implementations is not limited in this respect.

In some implementations, the synthesizer circuitry 1306D can be a fractional-N synthesizer or a fractional N/N+1 synthesizer, although the scope of the implementations is not limited in this respect as other types of frequency synthesizers can be suitable. For example, synthesizer circuitry 1306D can be a delta-sigma synthesizer, a frequency multiplier, or a synthesizer comprising a phase-locked loop with a frequency divider.

The synthesizer circuitry 1306D can be configured to synthesize an output frequency for use by the mixer circuitry 1306A of the RF circuitry 1306 based on a frequency input and a divider control input. In some implementations, the synthesizer circuitry 1306D can be a fractional N/N+1 synthesizer.

In some implementations, frequency input can be provided by a voltage-controlled oscillator (VCO), although that is not a requirement. Divider control input can be provided by either the baseband circuitry 1304 or the applications circuitry 1302 depending on the desired output frequency. In some implementations, a divider control input (e.g., N) can be determined from a look-up table based on a channel indicated by the applications circuitry 1302.

Synthesizer circuitry 1306D of the RF circuitry 1306 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1306D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310. In various implementations, the amplification through the transmit or receive signal paths can be done solely in the RF circuitry 1306, solely in the FEM circuitry 1308, or in both the RF circuitry 1306 and the FEM circuitry 1308.

In some implementations, the FEM circuitry 1308 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310).

In some implementations, the PMC 1312 can manage power provided to the baseband circuitry 1304. In particular, the PMC 1312 can control power-source selection, voltage scaling, battery charging, or DC-to-DC conversion. The PMC 1312 can often be included when the device 1300 is capable of being powered by a battery, for example, when the device is included in a UE. The PMC 1312 can increase the power conversion efficiency while providing desirable implementation size and heat dissipation characteristics.

While FIG. 13 shows the PMC 1312 coupled only with the baseband circuitry 1304. However, in other implementations, the PMC 1312 may be additionally or alternatively coupled with, and perform similar power management operations for, other components such as, but not limited to, application circuitry 1302, RF circuitry 1306, or FEM circuitry 1308.

In some implementations, the PMC 1312 can control, or otherwise be part of, various power saving mechanisms of the device 1300. For example, if the device 1300 is in an RRC_Connected state, where it is still connected to the RAN node as it expects to receive traffic shortly, then it can enter a state known as Discontinuous Reception Mode (DRX) after a period of inactivity. During this state, the device 1300 can power down for brief intervals of time and thus save power.

If there is no data traffic activity for an extended period of time, then the device 1300 can transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1302 and processors of the baseband circuitry 1304 can be used to execute elements of one or more instances of a protocol stack. For example, processors of the baseband circuitry 1304, alone or in combination, can be used execute Layer 3, Layer 2, or Layer 1 functionality, while processors of the baseband circuitry 1304 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 14:
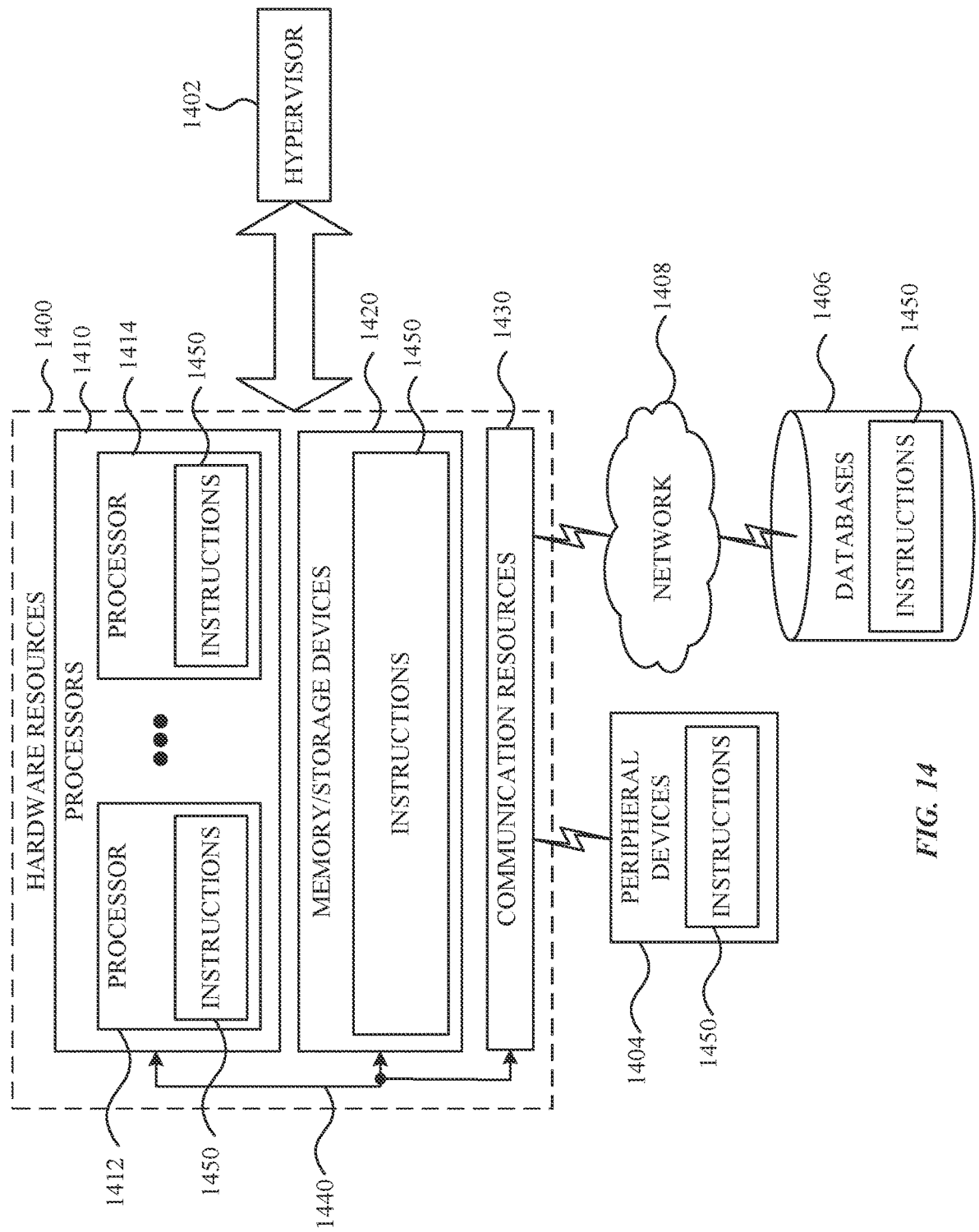
FIG. 14 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a UE may comprise: a memory; and one or more processors configured to, when executing instructions stored in the memory, cause the UE to: monitor a geographic location of UE relative to one or more bounding boxes, each bounding box, of the one or more bounding boxes, comprising a geographic area; detect entry of the UE into a bounding box of the one or more bounding boxes; generate, in response to the entry into the bounding box, an anonymous presence indicator comprising information identifying the bounding box without information identifying the UE; communicate the anonymous presence indicator to a bounding box server; initiate a re-report timer comprising a duration of time during which the UE refrains from sending another anonymous presence indicator; and continue monitoring the geographic location of UE relative to the one or more bounding boxes.

In example 2, which may also include one or more of the example described herein, when the UE is located within the bounding and upon expiration of the re-report timer, the UE is configured to: generate a second anonymous presence indicator for the bounding box; communicate the second anonymous presence indicator to the bounding box server; and re-initiate the re-report timer.

In example 3, which may also include one or more of the example described herein, wherein the UE is configured to: monitor for one or more trigger events associated with the bounding box, each trigger event of the one or more trigger events comprising a state or condition detectable by the UE; and detect a trigger event of the one or more trigger events, wherein the anonymous presence indicator is generated in response to detection of the trigger event while the UE is located within the bounding box.

In example 4, which may also include one or more of the example described herein, wherein: when the UE enters a second bounding box of the one or more bounding boxes, the UE is configured to: detect entry of the UE into the second bounding box; generate, in response to the entry into the bounding box, an anonymous presence indicator for the second bounding box comprising information identifying the second bounding box without information identifying the UE; communicate the anonymous presence indicator for the second bounding box to the bounding box server; initiate a re-report timer for the second bounding box; and continue monitoring the geographic location of UE relative to the one or more bounding boxes.

In example 5, which may also include one or more of the example described herein, wherein: when the UE is located within the second bounding and upon expiration of the re-report timer for the second bounding box, the UE is configured to: generate a second anonymous presence indicator for the second bounding box; communicate the second anonymous presence indicator to the bounding box server; and re-initiate the re-report timer for the second bounding box.

In example 6, which may also include one or more of the example described herein, wherein the UE is configured to: monitor for one or more trigger events associated with the second bounding box, each trigger event of the one or more trigger events associated with the second bounding box comprising a state or condition detectable by the UE; and detect a trigger event of the one or more trigger events associated with the second bounding box, wherein the second anonymous presence indicator is generated in response to detection of the trigger event while the UE is located within the second bounding box.

In example 7, which may also include one or more of the example described herein, wherein the anonymous presence indicator comprises: hashed bounding box information generated by applying a hash function to bounding box geo-information describing a geographic area of the bounding box; timing information comprising a beginning time of the anonymous presence indicator and an ending time determined by applying the re-report timer to the beginning time; and trigger information indicating an event trigger detected by UE prior to generation of the anonymous presence indicator.

In example 8, which may also include one or more of the example described herein, a method performed by a user equipment (UE), comprising: monitoring a geographic location of UE relative to one or more bounding boxes, each bounding box, of the one or more bounding boxes, comprising a geographic area; detecting entry of the UE into a bounding box of the one or more bounding boxes; generating, in response to the entry into the bounding box, an anonymous presence indicator comprising information identifying the bounding box without information identifying the UE; communicating the anonymous presence indicator to a bounding box server; initiating a re-report timer comprising a duration of time during which the UE refrains from sending another anonymous presence indicator; and continuing monitoring the geographic location of UE relative to the one or more bounding boxes.

In example 9, which may also include one or more of the example described herein, a non-transitory computer-readable comprising instructions that when executed by one or more processors cause the one or more processors to perform operations comprising: monitoring a geographic location of UE relative to one or more bounding boxes, each bounding box, of the one or more bounding boxes, comprising a geographic area; detecting entry of the UE into a bounding box of the one or more bounding boxes; generating, in response to the entry into the bounding box, an anonymous presence indicator comprising information identifying the bounding box without information identifying the UE; communicating the anonymous presence indicator to a bounding box server; initiating a re-report timer comprising a duration of time during which the UE refrains from sending another anonymous presence indicator; and continuing monitoring the geographic location of UE relative to the one or more bounding boxes.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
 a memory; and
 one or more processors configured to, when executing instructions stored in the memory, cause the UE to:
  monitor a geographic location of the UE relative to one or more bounding boxes, each bounding box of the one or more bounding boxes corresponding to a geographic area;
  detect entry of the UE into a bounding box of the one or more bounding boxes;
  generate, in response to the entry into the bounding box, an anonymous presence indicator without information identifying the UE and comprising information identifying the bounding box;
  communicate the anonymous presence indicator to a bounding box server;

monitor a duration of time during which the UE refrains from sending another anonymous presence indicator; and
continue monitoring the geographic location of the UE relative to the one or more bounding boxes.

2. The UE of claim 1, wherein:
the UE is configured to monitor the duration of time by initiating a corresponding re-report timer;
when the UE is located within the bounding box and upon expiration of the re-report timer, the UE is configured to:
generate a second anonymous presence indicator for the bounding box;
communicate the second anonymous presence indicator to the bounding box server; and
re-initiate the re-report timer.

3. The UE of claim 1, wherein the UE is configured to:
monitor for one or more trigger events associated with the bounding box, each trigger event of the one or more trigger events comprising a state or condition detectable by the UE; and
detect a trigger event of the one or more trigger events, wherein the anonymous presence indicator is generated in response to detection of the trigger event while the UE is located within the bounding box.

4. The UE of claim 1, wherein:
when the UE enters a second bounding box of the one or more bounding boxes, the UE is configured to:
detect entry of the UE into the second bounding box;
generate, in response to the entry into the second bounding box, an anonymous presence indicator for the second bounding box comprising information identifying the second bounding box without information identifying the UE;
communicate the anonymous presence indicator for the second bounding box to the bounding box server;
initiate a re-report timer for the second bounding box; and
continue monitoring the geographic location of the UE relative to the one or more bounding boxes.

5. The UE of claim 4, wherein:
when the UE is located within the second bounding box and upon expiration of the re-report timer for the second bounding box, the UE is configured to:
generate a second anonymous presence indicator for the second bounding box;
communicate the second anonymous presence indicator to the bounding box server; and
re-initiate the re-report timer for the second bounding box.

6. The UE of claim 4, wherein the UE is configured to:
monitor for one or more trigger events associated with the second bounding box, each trigger event of the one or more trigger events associated with the second bounding box comprising a state or condition detectable by the UE; and
detect a trigger event of the one or more trigger events associated with the second bounding box,
wherein the second anonymous presence indicator is generated in response to detection of the trigger event while the UE is located within the second bounding box.

7. The UE of claim 1, wherein the anonymous presence indicator comprises:
hashed bounding box information generated by applying a hash function to bounding box geo-information describing the geographic area;
timing information comprising a beginning time of the anonymous presence indicator and an ending time determined by applying to the beginning time a re-report timer corresponding to the duration of time; and
trigger information indicating an event trigger detected by UE prior to the generation of the anonymous presence indicator.

8. A method performed by a user equipment (UE), comprising:
monitoring a geographic location of the UE relative to one or more bounding boxes, each bounding box of the one or more bounding boxes corresponding to a geographic area;
detecting entry of the UE into a bounding box of the one or more bounding boxes;
generating, in response to the entry into the bounding box, an anonymous presence indicator comprising information identifying the bounding box without information identifying the UE;
communicating the anonymous presence indicator to a bounding box server;
monitoring a duration of time during which the UE refrains from sending another anonymous presence indicator; and
continuing monitoring the geographic location of the UE relative to the one or more bounding boxes.

9. The method of claim 8, further comprising:
initiating a re-report timer corresponding to the duration of time;
when the UE is located within the bounding box and upon expiration of the re-report timer,
generating a second anonymous presence indicator for the bounding box;
communicating the second anonymous presence indicator to the bounding box server; and
re-initiating the re-report timer.

10. The method of claim 8, further comprising:
monitoring for one or more trigger events associated with the bounding box, each trigger event of the one or more trigger events comprising a state or condition detectable by the UE; and
detecting a trigger event of the one or more trigger events, wherein the anonymous presence indicator is generated in response to detection of the trigger event while the UE is located within the bounding box.

11. The method of claim 8, further comprising:
when the UE enters a second bounding box of the one or more bounding boxes,
detecting entry of the UE into the second bounding box;
generating, in response to the entry into the second bounding box, an anonymous presence indicator for the second bounding box comprising information identifying the second bounding box without information identifying the UE;
communicating the anonymous presence indicator for the second bounding box to the bounding box server;
initiating a re-report timer for the second bounding box; and
continuing monitoring the geographic location of the UE relative to the one or more bounding boxes.

12. The method of claim 11, further comprising:
when the UE is located within the second bounding box and upon expiration of the re-report timer for the second bounding box,
generating a second anonymous presence indicator for the second bounding box;

communicating the second anonymous presence indicator to the bounding box server; and
re-initiating the re-report timer for the second bounding box.

13. The method of claim 11, further comprising:
monitoring for one or more trigger events associated with the second bounding box, each trigger event of the one or more trigger events associated with the second bounding box comprising a state or condition detectable by the UE; and
detecting a trigger event of the one or more trigger events associated with the second bounding box,
wherein the second anonymous presence indicator is generated in response to detection of the trigger event while the UE is located within the second bounding box.

14. The method of claim 9, wherein the anonymous presence indicator comprises:
hashed bounding box information generated by applying a hash function to bounding box geo-information describing the geographic area;
timing information comprising a beginning time of the anonymous presence indicator and an ending time determined by applying to the beginning time a re-report timer corresponding to the duration of time; and
trigger information indicating an event trigger detected by UE prior to the generation of the anonymous presence indicator.

15. A non-transitory computer-readable medium comprising instructions that when executed by one or more processors cause the one or more processors to perform operations comprising:
monitoring a geographic location of a UE relative to one or more bounding boxes, each bounding box of the one or more bounding boxes corresponding to a geographic area;
detecting entry of the UE into a bounding box of the one or more bounding boxes;
generating, in response to the entry into the bounding box, an anonymous presence indicator comprising information identifying the bounding box without information identifying the UE;
communicating the anonymous presence indicator to a bounding box server;
monitoring a duration of time during which the UE refrains from sending another anonymous presence indicator; and
continuing monitoring the geographic location of the UE relative to the one or more bounding boxes.

16. The non-transitory computer-readable medium of claim 15, wherein the instructions further cause the one or more processors to perform operations comprising:
initiating a re-report timer corresponding to the duration of time;
when the UE is located within the bounding box and upon expiration of the re-report timer,
generating a second anonymous presence indicator for the bounding box;
communicating the second anonymous presence indicator to the bounding box server; and
re-initiating the re-report timer.

17. The non-transitory computer-readable medium of claim 15, wherein the instructions further cause the one or more processors to perform operations comprising:
monitoring for one or more trigger events associated with the bounding box, each trigger event of the one or more trigger events comprising a state or condition detectable by the UE; and
detecting a trigger event of the one or more trigger events, wherein the anonymous presence indicator is generated in response to detection of the trigger event while the UE is located within the bounding box.

18. The non-transitory computer-readable medium of claim 15, wherein the instructions further cause the one or more processors to perform operations comprising:
when the UE enters a second bounding box of the one or more bounding boxes,
detecting entry of the UE into the second bounding box;
generating, in response to the entry into the second bounding box, an anonymous presence indicator for the second bounding box comprising information identifying the second bounding box without information identifying the UE;
communicating the anonymous presence indicator for the second bounding box to the bounding box server;
initiating a re-report timer for the second bounding box; and
continuing monitoring the geographic location of the UE relative to the one or more bounding boxes.

19. The non-transitory computer-readable medium of claim 18, wherein the instructions further cause the one or more processors to perform operations comprising:
when the UE is located within the second bounding box and upon expiration of the re-report timer for the second bounding box,
generating a second anonymous presence indicator for the second bounding box;
communicating the second anonymous presence indicator to the bounding box server; and
re-initiating the re-report timer for the second bounding box.

20. The non-transitory computer-readable medium of claim 18, wherein the instructions further cause the one or more processors to perform operations comprising:
monitoring for one or more trigger events associated with the second bounding box, each trigger event of the one or more trigger events associated with the second bounding box comprising a state or condition detectable by the UE; and
detecting a trigger event of the one or more trigger events associated with the second bounding box,
wherein the second anonymous presence indicator is generated in response to detection of the trigger event while the UE is located within the second bounding box.

* * * * *